US009725601B2

(12) United States Patent
Islam

(10) Patent No.: US 9,725,601 B2
(45) Date of Patent: Aug. 8, 2017

(54) CARBON NANOTUBE AEROGELS, COMPOSITES INCLUDING THE SAME, AND DEVICES FORMED THEREFROM

(75) Inventor: Mohammad F. Islam, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 682 days.

(21) Appl. No.: 14/009,692

(22) PCT Filed: Apr. 4, 2012

(86) PCT No.: PCT/US2012/032229
§ 371 (c)(1),
(2), (4) Date: Jan. 10, 2014

(87) PCT Pub. No.: WO2012/138803
PCT Pub. Date: Oct. 11, 2012

(65) Prior Publication Data
US 2014/0127490 A1 May 8, 2014

Related U.S. Application Data

(60) Provisional application No. 61/516,458, filed on Apr. 4, 2011, provisional application No. 61/575,941, filed on Aug. 31, 2011.

(51) Int. Cl.
*C09D 1/00* (2006.01)
*B82Y 30/00* (2011.01)
(Continued)

(52) U.S. Cl.
CPC ............... *C09D 1/00* (2013.01); *B82Y 30/00* (2013.01); *B82Y 40/00* (2013.01); *C01B 31/02* (2013.01);
(Continued)

(58) Field of Classification Search
CPC ......... B82Y 30/00; B82Y 40/00; C01B 31/02; C01B 31/0273; C01B 2202/02;
(Continued)

(56) References Cited

U.S. PATENT DOCUMENTS

2007/0284557 A1* 12/2007 Gruner .................. B82Y 30/00
252/500
2010/0092371 A1 4/2010 Backov et al.
(Continued)

OTHER PUBLICATIONS

Baughman et al. ("Giant-Stroke, Superelastic Carbon Nanotube Aerogel Muscles" Science 2009, 323, p. 1575-1578).*
(Continued)

*Primary Examiner* — Maria Veronica Ewald
*Assistant Examiner* — Travis Figg
(74) *Attorney, Agent, or Firm* — Fish & Richardson P.C.

(57) ABSTRACT

An aerogel fabricated by forming an aqueous suspension including carbon nanotubes and a surfactant, agitating the aqueous suspension, and centrifuging the agitated suspension to form a supernatant including the carbon nanotubes. The supernatant is concentrated to form a concentrated suspension including the carbon nanotubes, and a hydrogel is formed from the concentrated suspension. The hydrogen is contacted with a strong acid to form an acidic hydrogel and to remove surfactant from the hydrogel, and then neutralized. An aerogel is formed from the hydrogel. The aerogel may consist essentially of carbon nanotubes. A composite may be formed from the hydrogel or the aerogel by infiltrating the hydrogel or the aerogel with a polymeric material and curing or pyrolyzing the polymeric material. The composite may be electrically conductive, transparent, flexible, superelastic, or any combination thereof. A device, such as a flexible conductor, sensor, or electrode may include the aerogel or the composite.

38 Claims, 25 Drawing Sheets

(51) Int. Cl.
*C01B 31/02* (2006.01)
*C09K 11/02* (2006.01)
*H01B 1/04* (2006.01)
*C08K 7/24* (2006.01)
*C08K 9/02* (2006.01)
*B82Y 40/00* (2011.01)

(52) U.S. Cl.
CPC ............ *C01B 31/0273* (2013.01); *C08K 7/24* (2013.01); *C08K 9/02* (2013.01); *C09K 11/025* (2013.01); *H01B 1/04* (2013.01); *C01B 2202/02* (2013.01); *C01B 2202/04* (2013.01); *C01B 2202/06* (2013.01); *Y10T 428/249956* (2015.04); *Y10T 428/30* (2015.01)

(58) Field of Classification Search
CPC ... C01B 2202/04; C01B 2202/06; C08K 7/24; C08K 9/02; C09D 1/00; C09K 11/025; H01B 1/04; Y10T 428/249956; Y10T 428/30
See application file for complete search history.

(56) References Cited

U.S. PATENT DOCUMENTS

2010/0187484 A1 7/2010 Worsley et al.
2011/0024698 A1 2/2011 Worsley et al.
2011/0224376 A1* 9/2011 Zhai ................... B01J 13/0091
525/186
2012/0037854 A1 2/2012 Worsley et al.

OTHER PUBLICATIONS

Yodh et al. ("Carbon Nanotube Aerogels" Adv. Mater. 2007, 19, p. 661-664, reference provided by Applicant).*
Kimura et al. ("Shape memory effect and mechanical properties of carbon nanotube/shape memory polymer nanocomposites" Composite Structures 2007, 81, p. 176-184).*
Zhao et al. ("Near-Infrared Fluorescent Materials for Sensing of Biological Targets" Sensors 2008, 8, p. 3082-3105).*
Bryning et al. ("Carbon Nanotube Aerogels" Adv. Mater. 2007, 19, p. 661-664.*
Definition of throughout.*
L.A. Hough et al., "Viscoelasticity of single wall carbon nanotube suspensions," Phys. Rev. Lett. 2004; 93(16):168102-1-168102-4.
L.A. Hough et al., "Structure of semidilute single-wall carbon nanotube suspensions and gels," Nano. Lett. 2006; 6(2):313-317.
D.E. Johnston et al., Nat. Mater. 4, 589 (2005).
Mateusz B. Bryning et al., Adv. Mater. 2007, 19:661-664.
International Search Report from corresponding Application No. PCT/US2012/032229, dated Dec. 3, 2012, pp. 1-5.
International Preliminary Report on Patentability from corresponding Application No. PCT/US2012/032229, dated Oct. 17, 2013, pp. 1-7.

* cited by examiner

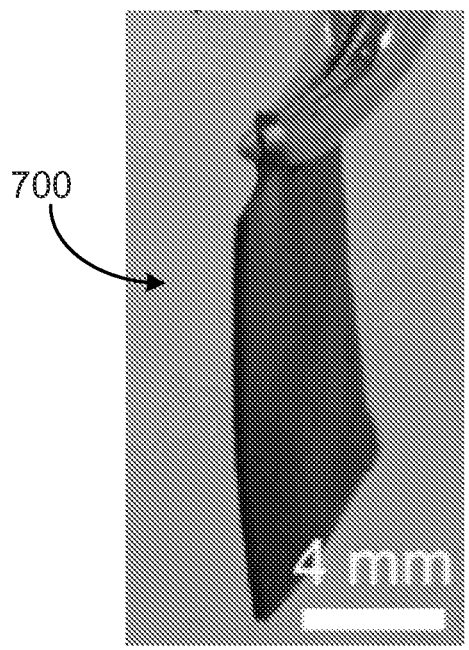
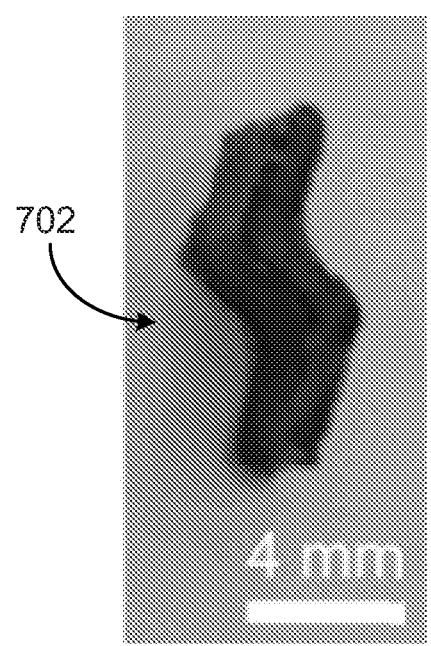
FIG. 7A  FIG. 7B
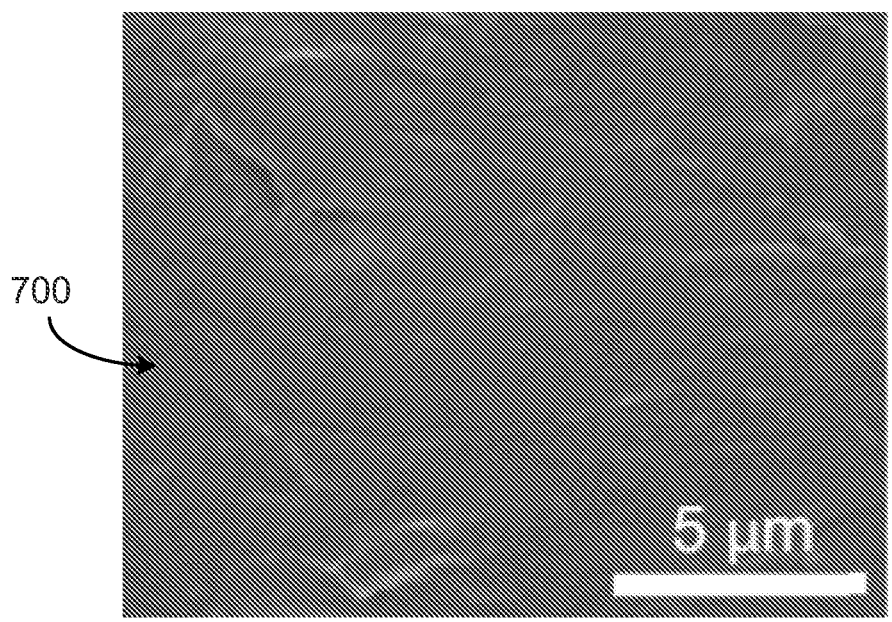
FIG. 7C

A Pristine SWCNT Aerogel

A Pristine SWCNT Elastic gel

Partial TPU Infiltration via vacuum

Complete Infiltration of TPU

Thermal Vacuum Annealing at 150 °C for 10hrs

Hot Press Process to Remove Residual Voids

Final SWCNT-Aerogel/TPU Composite

CARBON NANOTUBE AEROGELS, COMPOSITES INCLUDING THE SAME, AND DEVICES FORMED THEREFROM

CROSS-REFERENCE TO RELATED APPLICATIONS

This application is the U.S. national stage under 35 USC §371 of International Application Number PCT/US2012/032229, filed on 4 Apr. 2012, entitled "CARBON NANOTUBE AEROGELS, COMPOSITES INCLUDING THE SAME, AND DEVICES FORMED THEREFROM" which claims priority to U.S. Application No. 61/575,941 filed 31 Aug. 2011, entitled "SUPERLASTIC GRAPHENE COATED CARBON NANOTUBE AEROGELS" and U.S. Application No. 61/561,458, filed on 4 Apr. 2011, entitled "SINGLE WALL CARBON NANOTUBE AEROGEL-BASED ELASTIC CONDUCTORS", the entire contents of which are hereby incorporated by reference.

FEDERALLY SPONSORED RESEARCH OR DEVELOPMENT

This invention was made with government support under Grant Nos. DMR-0645596 and CBET-0933510 awarded by the National Science Foundation. The government has certain rights in the invention.

TECHNICAL FIELD

This invention related to carbon nanotube aerogels, composites including the same, and devices formed therefrom.

BACKGROUND

Individual single wall carbon nanotubes (SWCNTs) have large surface area and extraordinary strength, with high electrical and thermal conductivity. Bulk, composite materials containing SWCNTs have been developed, including sheets with high electrical and thermal conductivities and fibers and foams with high mechanical strength. SWCNT forests with electron-emission properties have been utilized in display and energy storage applications. Bulk SWCNT materials have also been considered for photovoltaic devices, thermoelectric converters, and artificial muscles. Unfortunately, most macroscale materials with SWCNTs do not reflect the large surface area, strength or conductivity of individual SWCNTs.

Three dimensional (3D) porous carbon nanotube (CNT) networks or aerogels are a class of bulk CNT materials that combine high electrical conductivity of CNTs with high surface area and are thermally insulating due to low CNT density. Porous CNT networks have been fabricated by drawing multiwall CNTs (MWCNTs) from MWCNT forests. Solution-processed CNT aerogels have been formed using a mixture of SWCNTs and MWCNTs. For some applications, SWCNTs have physical properties that are superior to those of MWCNTs. However, elastic gels of only SWCNTs produced with known methodologies were significantly more fragile than MWCNT gels, due at least in part to the shorter length of SWCNTs (~1 μm) compared to MWCNTs (tens of μm). Shorter SWCNTs have fewer entanglements; increased CNT entanglements increase gel stiffness and stability. Typically, the SWCNT elastic gels collapsed or the aerogels cracked during fabrication. Moreover, known SWCNT-based bulk materials have a specific surface area (SSA) at least an order of magnitude lower than that thought to be theoretically possible (e.g., about 1315 $m^2/g$ for SWCNTs with closed-ends and about 1600 $m^2/g$ for SWCNTs with open-ends).

CNT-based elastic conductors typically offer modest electrical conductivity, require high concentration of CNTs, are opaque, and exhibit significantly decreased electrical conductivity when stretched. Furthermore, graphene and CNTs phase-segregate or agglomerate within elastomers during dispersion, hindering practical scale usage of graphene- or CNT-based elastic conductors. The poor enhancement of mechanical properties of the composites is ascribed to the agglomeration or bundling of SWCNTs by strong van der Waals interactions.

SUMMARY

A first general aspect includes forming an aqueous suspension including carbon nanotubes and a surfactant, agitating the aqueous suspension to form an agitated suspension, and centrifuging the agitated suspension to form a supernatant including the carbon nanotubes. The supernatant is concentrated to form a concentrated suspension including the carbon nanotubes, and a hydrogel including carbon nanotubes and the surfactant is formed from the concentrated suspension. The hydrogel is contacted with a strong acid to form an acidic hydrogel and to remove the surfactant from the hydrogel, and the acidic hydrogel is neutralized to form a neutralized hydrogel. The neutralized hydrogel may be substantially free of surfactant.

Implementations may include one or more of the following features. For example, the carbon nanotubes may be single-wall carbon nanotubes, double-wall carbon nanotubes, multi-wall carbon nanotubes, or any combination thereof. The strong acid may be nitric acid. The concentrated suspension may be degassed before the hydrogel is formed. An aerogel is formed from the neutralized hydrogel. Forming the aerogel from the neutralized hydrogel may include autoclaving the neutralized hydrogel. In some cases, water in the neutralized hydrogel is replaced or exchanged with ethanol to form a wet gel comprising ethanol and the carbon nanotubes. An aerogel may be formed from the wet gel. Forming the aerogel may include, for example, critical point drying or freeze drying the wet gel to form the aerogel. The aerogel may consist essentially of carbon nanotubes, such as single-wall carbon nanotubes, double-wall carbon nanotubes, multi-wall carbon nanotubes, or any combination thereof.

In some cases, the aerogel is contacted with a polymeric material. The aerogel is infiltrated with the polymeric material to form an infiltrated aerogel. The polymer may include, for example, elastomers (e.g., poly(dimethylsiloxane)), epoxies, urethanes, thermosets, thermoplastics (e.g., thermoplastic polyurethane), conducting polymers, nylons, poly (methyl methacrylate), polystyrene, polyethylene, polypropylene, polyether ether ketone, KEVLAR, and the like. The polymeric material in the infiltrated aerogel is cured to form a composite. The composite may be hot-pressed to reduce or eliminate voids in the composite.

In some cases, the neutralized hydrogel is contacted with (e.g., washed with, soaked in, etc.) a fluid comprising a solvent and a polymeric material to deposit the polymeric material on the carbon nanotubes to form a wet gel including the polymeric material. The solvent may be, for example, tetrahydrofuran, and the polymeric material may include polyacrylonitrile. An aerogel may be formed from the wet gel. In some cases, the aerogel is degassed. The aerogel may be heated to form graphene from the polymeric material, thereby coating the carbon nanotubes with the graphene to form a composite.

Other aspects include aerogels and composites formed as described above, and devices including the aerogels and composites. The aerogel may consist essentially of carbon nanotubes (e.g., single-wall carbon nanotubes), may have a specific surface area of at least 1250 $m^2/g$, may have a density in a range between 0.1 mg/ml and 30 mg/ml or between 0.3 mg/ml and 10 mg/ml, or any combination thereof. Devices including the aerogels or composites may be, for example, elastic conductors, electrodes, flexible displays, stretchable electronic implants, artificial mechanoreceptors, electrically actuated elastomers for artificial muscles, loudspeakers, sensors, nanoelectronics, energy harvesting devices, organic photovoltaic devices, light emitting diodes, dampers (e.g., for high-gravity mechanical applications, as impact protection in aerospace applications and packaging), heat sinks in electronics, catalyst supports, sieves in filtration devices, scaffolds for composites, mechanical structures, shock absorbers, coatings (e.g., for electrostatic dissipation in aircraft, windmills, etc.).

The aerogels, composites including the aerogels, and devices formed therefrom may be flexible, transparent, elastic, superelastic, or any combination thereof. In some cases, carbon nanotubes in the aerogels and/or composites formed as described herein are coated with graphene. In certain cases, an aerogel formed as described herein recovers its original shape at a rate of at least 672 mm/min after removal of a load. Aerogels described herein may also include a polymer in voids defined by carbon nanotubes in the aerogel.

In another aspect, a composite includes an aerogel consisting essentially of single-wall carbon nanotubes, the aerogel defining voids between the single-walled carbon nanotubes and a polymeric material at least partially filling the voids between the single-walled carbon nanotubes. A specific surface area of the aerogel may be at least 650 $m^2/g$. The composite may be electrically conductive, transparent, flexible, or any combination thereof. Dimensions of the composite demonstrate shrinkage compared to a wet gel from which the composite is formed of less than 10% in each dimension. In some cases, the polymeric material is thermoplastic urethane, and the tensile modulus of the composite exceeds the tensile modulus of the aerogel by at least $1 \times 10^6$%. In certain cases, wherein the composite emits near infrared fluorescence under tensile strain. The composite may be in the form of a coating or a packaging material.

In another aspect, a device includes a conductive composite as described herein. The conductive composite includes an aerogel consisting essentially of carbon nanotubes and at least partially filled with a polymeric material, wherein a density of the aerogel, before filling with the polymeric material, is between 0.1 mg/ml and 30 mg/ml. The device may be, for example, an electrode, a sensor, an elastic conductor, packaging, or a filter.

Advantages of the aerogels, composites, and devices described herein include a low density, high surface area aerogel that can be used to make flexible, transparent, elastic composites for a variety of applications. Fabrication of the aerogel promotes the formation of a carbon nanotube network in which a majority or substantially all of the carbon nanotubes These general and specific aspects may be implemented in any combination to yield a device, composite, aerogel, or method, or any combination of devices, composites, aerogels, or methods. The details of one or more embodiments are set forth in the accompanying drawings and the description below. Other features, objects, and advantages will be apparent from the description and drawings, and from the claims.

BRIEF DESCRIPTION OF THE DRAWINGS

The concepts herein may be more completely understood in consideration of the following detailed description of various embodiments in connection with the accompanying drawings.

FIGS. 7A and 7B depict images of non-transparent composite films of SWCNT aerogels with poly(dimethylsiloxane) (PDMS) formed as described in EXAMPLE 2 into rectangular and wavy structures, respectively. FIG. 7C depicts an SEM images of a cross section of a non-transparent composite film formed as described in EXAMPLE 2.

FIG. 9A shows normalized resistance for the first two stretch-release cycles for transparent films. FIG. 9B shows normalized resistance for the $5^{th}$ and $20^{th}$ stretch-release cycles for transparent films, indicating that the initial stretch-induced change reaches steady state by 5 stretches. FIG. 9C shows normalized resistance for the first two stretch-release cycles for non-transparent films. FIG. 9D shows normalized resistance for the $5^{th}$ and $20^{th}$ stretch-release cycles for non-transparent films, indicating that the initial stretch-induced change reaches steady state by 5 stretches. FIG. 9E shows normalized resistance of non-transparent SWCNT-aerogel/PDMS composite films under uniaxial tensile strain perpendicular to conduction direction for 5th and 20th stretching cycles, indicating isotropic behavior of the materials.

FIG. 11A is a TEM image showing an anisotropic 3D network of SWCNTs with a uniform graphene coating. FIG. 11B shows SWCNTs coated with about 3 layers of about 3 nm graphene flakes. Boundaries and vacancies of flakes are marked with arrows in the inset. FIG. 11C is an SEM image and a TEM image (inset) showing a higher concentration of graphene at the nodes between SWCNTs.

FIG. 12A shows an SEM image and a FFT analysis (inset) indicating that Gr-coated SWCNTs are isotropic in aerogels at $\epsilon=0\%$. FIG. 12B shows an SEM image and a FFT analysis (inset) indicating that Gr-coated SWCNTs are aligned at $\epsilon=40\%$. FIG. 12C shows an SEM image indicating that Gr-coated SWCNTs are significantly aligned at $\epsilon=80\%$.

FIG. 13A is a photograph showing SWCNT aerogels collapsed while Gr-coated SWCNT aerogels recovered original shape after compression by about 90%. FIG. 13B shows $\sigma$ versus $\epsilon$ curves for SWCNT aerogels along loading and for Gr-coated SWCNT aerogels for loading-unloading cycles. The hysteresis increased at larger $\epsilon$ for Gr-coated SWCNT aerogels. FIG. 13C shows fatigue resistance of Gr-coated SWCNT aerogel at 60% strain, 1 Hz, 1st and $2,000^{th}$ cycles. FIG. 13D shows fatigue resistance of Gr-coated SWCNT aerogel at 2% strain, 100 Hz, 1st and $10^6$th cycles.

FIG. 14A shows E' and E" of SWCNT and Gr-coated SWCNT aerogels. E" curves are nearly identical for both type of aerogels. FIG. 14B shows a dramatic decrease in $R/R_0$ with an increase in $\epsilon$ for SWCNT aerogels but a more gradual decrease for Gr-coated SCNT aerogels.

DETAILED DESCRIPTION

Figure 1:
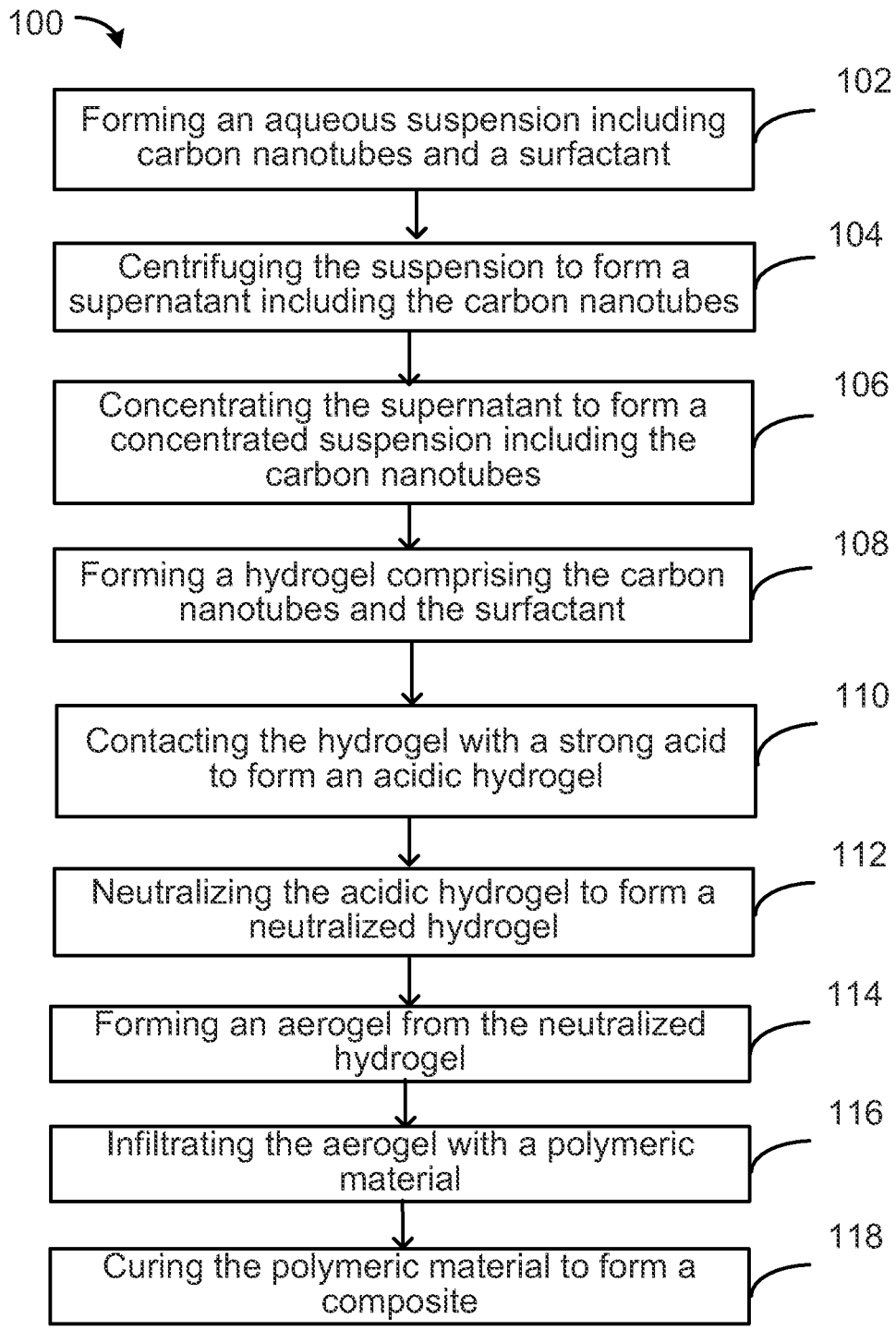
FIG. 1 is a flow chart showing a process for fabricating a carbon nanotube aerogel, a composited including the same, and a device formed therefrom.

FIG. 1 is a flowchart of process 100 for fabricating a CNT aerogel. The concentration of SWCNTs in the CNT aerogels fabricated as described herein ranges from about 0.1 mg/ml to about 30 mg/ml (e.g., about 0.3 mg/ml to 10 mg/ml)', with the rest being void space. That is, the aerogels consist essentially of carbon nanotubes (e.g., single-wall, double-wall, or multi-wall CNTs or any combination thereof). The aerogel shapes and sizes are readily tunable, and their properties can be manipulated by tuning SWCNT orientation and pore size. In addition, the electrical transport properties of the aerogels can be varied by using appropriate SWCNT types (metallic or semiconducting) and/or chiralities. SWCNT aerogels of thickness ≤30 µm have excellent transparency and are semi- or non-transparent at higher thicknesses. The SWCNT aerogel structure and properties, as well as the flexibility in the fabrication process yield efficient and effective stretchable conductors.

In 102, an aqueous suspension including carbon nanotubes and a surfactant is formed. The carbon nanotubes may include single-wall, double-wall, or multi-wall CNTs or any combination thereof. In some cases, the carbon nanotubes consist essentially of a single type of carbon nanotubes (e.g., single-wall CNTs). Suitable surfactants include sodium dodecylbenzene sulfonate (SDBS) and others such as polaxamers generally known in the art that can be used to effectively gel CNTs. The aqueous suspension is centrifuged in 104 to form a supernatant including the CNTs. A majority (e.g., at least 60%, at least 70%, at least 80%, at least 95%, or at least 95%) or substantially all (e.g., at least 99%) of the CNTs in the supernatant are "individually dispersed" or "isolated" (e.g., not agglomerated or held together with van der Waals forces). The supernatant is concentrated (e.g., by heating to remove water) to form a concentrated suspension including the CNTs. In 108, a hydrogel is formed from the concentrated suspension (e.g., by allowing the concentrated suspension to sit). As used herein, "hydrogel" generally refers to a gel in which water is the dispersion medium. In 110, the hydrogel is contacted (e.g., soaked or washed) with a strong acid (e.g., nitric acid) to form an acidic hydrogel. The strong acid may have, for example, a concentration in a range between 0.5 M and 2.5 M and may be of a temperature greater than room temperature but less than 100° C. (e.g., ° C.). Contacting the hydrogel with the strong acid removes substantially all (e.g., at least 99 wt %) of the surfactant, leaving a substantially surfactant-free hydrogel. It should be noted that removing the surfactant without the use of hot water avoids significant shrinkage of the CNT hydrogel, and therefore avoids the associated increase in density of the aerogel. After contacting with the strong acid, the acidic hydrogel is neutralized in 112 to a pH of about 7. Neutralizing may include, for example, washing with or soaking in water.

In 114, an aerogel is formed from the hydrogel. As used herein, "aerogel" generally refers to a porous solid formed from a gel, such as a hydrogel or wet gel, in which the liquid is replaced with a gas (e.g., air). The aerogel may be formed in a variety of methods known in the art, such as freeze-drying or critical point drying. In these methods, water in the hydrogel is typically exchanged with ethanol to form a wet gel including the CNTs and ethanol, and the wet gel is then dried or frozen to remove the ethanol. Exchanging water in the hydrogel with ethanol may include, for example, sequentially soaking the surfactant-free hydrogel in ethanol baths (ranging from about 20 to about 100 vol % anhydrous ethanol) with a step size of 20% for 48 hrs at room temperature to form a wet gel including ethanol and the CNTs. In some cases, an aerogel may be formed by autoclaving a hydrogel (i.e., water in the hydrogel is not removed prior to forming the aerogel). The aerogels fabricated as described herein are ultralight and electrically conducting. The CNTs (e.g., SWCNTs) are connected to each other within the network via van der Waals interactions at the CNT-CNT junctions. The concentration of CNTs fabricated as described herein ranges from about 0.3 mg/ml to about 30 mg/ml, with, in some cases, the rest being void space. That is, the aerogels may consist essentially of carbon nanotubes (e.g., single-wall, double-wall, or multi-wall CNTs or any combination thereof). Shrinkage of about 20% or less, about 15% or less, or about 10% or less along each dimension of the aerogel is observed compared to the hydrogel. The aerogel shapes and sizes are readily tunable, and their properties can be manipulated by tuning CNT orientation and pore size. In addition, the electrical transport properties of the aerogels can be varied by using appropriate CNT types (metallic or semiconducting) and chiralities. CNT aerogels of thickness ≤30 μm have excellent transparency and are semi- or non-transparent at higher thicknesses.

In 116, the aerogel is infiltrated with a polymeric material (e.g., a polymer or any precursor thereof). Infiltrating the aerogel with the polymeric material may include contacting the aerogel with the polymeric material, soaking the aerogel with the polymeric material, washing the aerogel with a solution containing the polymeric material, or backfilling the aerogel with the polymeric material under vacuum conditions. Suitable polymeric materials include, but are not limited to, elastomers (e.g., poly(dimethylsiloxane)), epoxies, urethanes, thermosets, thermoplastics (e.g., thermoplastic polyurethane), conducting polymers, nylons, poly(methyl methacrylate), polystyrene, polyethylene, polypropylene, polyether ether ketone, KEVLAR, and the like. The polymeric materials may be, for example, electrically conducting and/or thermally conducting. In 118, the polymeric material is cured to form a composite (e.g., a thin film CNT/polymer composite). Curing may include, for example, thermal vacuum annealing. The composite is generally the same size and shape as the aerogel.

In some cases, portions of process 100 in FIG. 1 may be omitted in the fabrication of an aerogel. In certain cases, process 100 may include additional actions. In one example, the concentrated suspension may be degassed before the hydrogel is allowed to form. In another example, a hot press may be used to remove residual pores after curing of the polymeric material. A spacer in the hot press may be used to determine a thickness of the composite that is formed. In another example, a wet gel, elastic gel, or hydrogel (e.g., surfactant free) is contacted with a solution including a solvent and a polymeric material as precursors for the synthesis of graphene sheets on nanotube surfaces. The solvent may be exchanged with ethanol, and an aerogel may be formed, the aerogel including CNTs coated with the polymeric material. The polymeric material is then hydrolyzed to form a graphene-coated aerogel, or superelastic network capable of recovering its shape quickly after compression release.

Porous three-dimensional network structures or aerogels of CNTs (e.g., SWCNTs) described herein have large specific surface area (SSA) and electrical conductivity, and can be used in applications such as electrodes in energy applications, fillers in composites, and membranes for separations. The aerogels are low density, free-standing, and electrically conducting with ultrahigh surface area from suspensions of individually dispersed (isolated) single wall carbon nanotubes (SWCNTs). SSA of the fabricated aerogels is at least 1200 $m^2/g$, at least 1250 $m^2/g$, or at least 1290 $m^2/g$. In one example, the specific surface area of aerogels having a density of 7.3 mg/ml was 1291 $m^2/g$, which is close to the theoretical limit for SWCNTs with closed-ends (~1315 $m^2/g$). The pore diameter within the aerogels ranges from, for example, 1 nm to 40 nm, or 2.5 nm to 36 nm, with majority of the pores having diameters, for example, between 2.5-14 nm. The pore structures within the aerogel with same density showed minimal batch-to-batch variations. The high surface area, large porosity and electrically conducting properties make these aerogels particularly useful for electrodes in energy storage applications.

In one example, an aerogel fabricated as described herein is backfilled with an elastomer to form an elastic conductor. In another example, an aerogel fabricated as described herein is backfilled with a thermoplastic polyurethane to form a SWCNT aerogel-based polymer composite showing a 340 fold enhancement of elastic modulus. In another example, an aerogel fabricated as described herein is coated with a polyacrylonitrile (PAN) polymer, and the PAN is converted into mono-multi-layer graphene and graphitic structures via a two-step pyrolysis process to transform CNT networks into superelastic networks while maintaining the strength, ultracompressability, high porosity, and conductivity of the CNT networks.

Examples of uses for composites fabricated as described herein include elastic conductors, electrodes, flexible displays, stretchable electronic implants, artificial mechanoreceptors, electrically actuated elastomers for artificial muscles, loudspeakers, sensors, nanoelectronics, energy harvesting devices, organic photovoltaic devices, light emitting diodes, dampers (e.g. for high-gravity mechanical applications, as impact protection in aerospace applications and packaging), heat sinks in electronics, catalyst supports, sieves in filtration devices, scaffolds for composites, mechanical structures, shock absorbers, coatings (e.g., for electrostatic dissipation in aircraft, windmills, etc.), and the like.

EXAMPLES

The following examples are provided to more fully illustrate some of the embodiments of the present disclosure. It should be appreciated by those of skill in the art that the techniques disclosed in the examples which follow represent techniques discovered by the inventors to function well as described herein, and thus can be considered to constitute exemplary modes. However, those of skill in the art should, in light of the present disclosure, appreciate that many changes can be made in the specific embodiments that are disclosed and still obtain a like or similar result without departing from the spirit and scope of the disclosure.

Example 1

In this example, fabrication of aerogels from semiconducting SWCNTs is described. Using the Brunauer-Emmett-Teller (BET) surface area measurement system, the SSA, pore volume, and the pore size distributions for these SWCNT aerogels with various densities have been determined. The SSA of aerogels with a density of 7.3 mg/ml was determined to be 1291 $m^2/g$, or close to the theoretical limit of about 1315 $m^2/g$ for SWCNTs with closed-ends and about 1600 m²/g for SWCNTs with open-ends. The SWCNT aerogels fabricated as described in this example had mesopores with diameters ranging from 2.5 nm to 36 nm with most pores of size 2.5-14 nm. The pore structure was reproducible for aerogels with similar density and fabrication method.

CoMoCAT-based SG65 SWCNTs (diameter: about 0.8 nm, length: about 450 nm to about 1 nm; SouthWest NanoTechnologies Inc.) were purified as generally known in the art. The purified SWCNTs were suspended in Millipore-filtered deionized water at a concentration of 0.1 wt % using sodium dodecylbenzene sulfonate (SDBS) surfactant (Acros Organics) at a SWCNT:SDBS ratio of 1:5 or 1:10; different SWCNT:SDBS ratio did not result in any noticeable difference in aerogel quality. The solution was sonicated using a tip sonicator (Thermo Fisher 500) for 2 hrs at 60 W followed by centrifugation at 21,000 g for 30 min (Beckman Coulter Allegra 25R) to sediment SWCNT bundles. The supernatant, which contained mostly isolated SWCNTs, was collected. The SWCNT concentration in the supernatant was determined using optical absorbance (Varian Cary 5000 UV-Vis-NIR spectrometer) with an extinction coefficient of 2.6 (absorbance-ml)/(mg-mm) at 930 nm and the Lambert-Beer equation. The SWCNT dispersion showed sharp van Hove peaks in the absorption and fluorescence spectra and remained electrically conducting, indicating that the purification and dispersion process did not cut or open the ends of SWCNTs. The supernatant was then concentrated by evaporating water off to a final concentration of 3.5 to 4.5 mg/ml. The concentrated SWCNT solution was degassed to remove any bubbles and then poured into various cylindrical and rectangular molds; bubbles significantly degrade the mechanical integrity of aerogels. The SWCNT solution formed a hydrogel within 12 hrs.

To remove SDBS from the hydrogel, the hydrogel was washed in 1 M nitric acid at 50° C. for 20 minutes; the acid wash did not damage SWCNTs. Surfactant removal by hot water is known to induce a significant shrinkage of SWCNT hydrogels, and was avoided. The acid-washed SWCNT hydrogels were neutralized by washing with deionized water until the pH equilibrated to about 7. To create the SWCNT aerogel, the water was exchanged with ethanol by sequentially soaking the surfactant-free hydrogel in ethanol baths (ranging from about 20 to about 100 vol % anhydrous ethanol) with a step size of 20% for 48 hrs at room temperature to form a gel consisting essentially of ethanol and SWCNTs. The ethanol was then removed from the hydrogel via critical-point-drying (CPD) (Autosamdri 815, Tousimis). Energy dispersive X-ray (EDX) spectroscopy showed no sulfur present in the SWCNT aerogels (quantitative analysis limit of <1 wt %). Since sulfur is a component of SDBS, the final SWCNT aerogels were considered to be substantially free of surfactant. Shrinkage of about 10% along each dimension of the aerogel, compared to the dimensions of the hydrogel, was observed. The SWCNT mass density of the aerogel was calculated based on the final mass and dimensions of the aerogel.

The SSA of the aerogels was measured by adsorption of nitrogen at 77K using a BET surface area measurement system (Quantachrome NOVA 2000). The pore volumes and the pore size distributions were then determined from the nitrogen isotherms at 77K using the Barret, Joyner, and Halenda (BJH), and non local density functional theory (NLDFT) methods. The pore sizes and the pore structures were further verified via imaging of SWCNT aerogel cross-sections using scanning electron microscopy (SEM) and transmission electron microscopy (TEM). Electrical conductivities were measured as a function of density using 2 probe measurement system (EC-Lab V 10 and Fluke Ohmmeter). Raman spectra were collected using an inverted Raman confocal microscope (inVia Raman microscope, Renishaw) with a 785 nm laser (100 mW), a 20×(0.85 NA) objective (Leica Microsystems). The scan time was 5 min. Ten scans were collected at five different locations for each sample and then averaged to improve signal to noise ratio. The data collection and data analysis was performed using WiRE software (Renishaw).

Figure 2A:
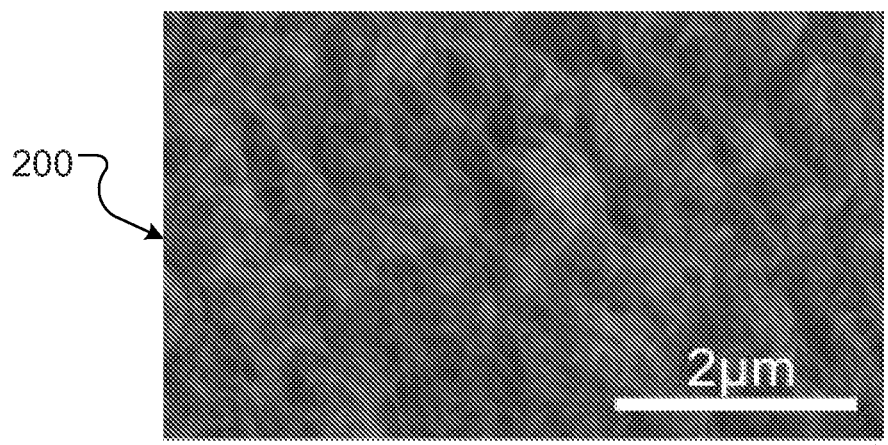
FIG. 2A depicts a scanning electron microscopy (SEM) image of a cross-section of an aerogel formed as described in EXAMPLE 1 showing networks of SWCNTs.
Figure 2B:
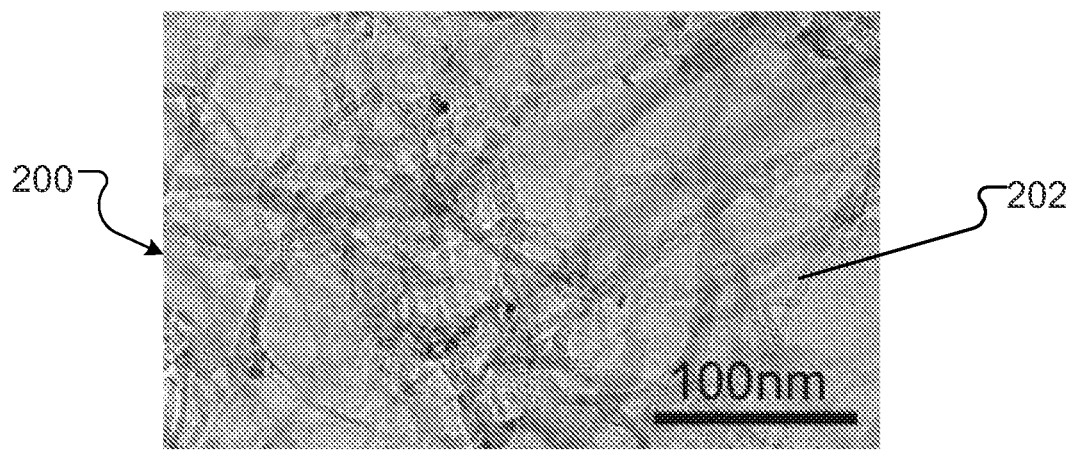
FIG. 2B depicts a low magnification transmission electron microscopy (TEM) image and FIG. 2C depicts a high resolution TEM image, both showing mostly isolated and intertwined SWCNTs in the aerogel.
Figure 2C:
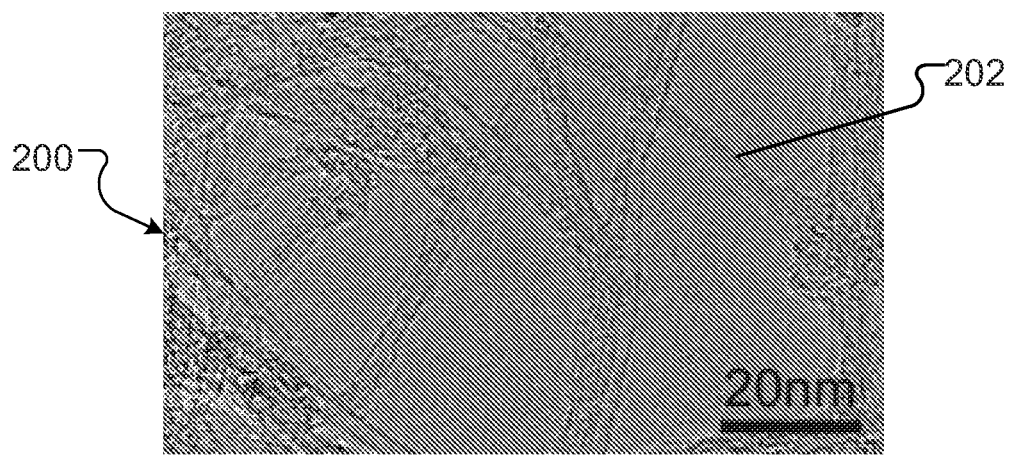

Using the wet gel precursor, free-standing SWCNT aerogels were made into various sizes and shapes using the appropriate molds by methods generally known in the art and described for example, in L. A. Hough et al., Viscoelasticity of single wall carbon nanotube suspensions, Phys. Rev. Lett. 2004; 93(16):168102-1-168102-4 and L. A. Hough et al., Structure of semi-dilute single-wall carbon nanotube suspensions and gels, Nano. Lett. 2006; 6(2):313-317, both of which are incorporated by reference herein. FIG. 2A is a high resolution SEM image showing a cross section of SWCNT aerogel 200 having an isotropic 3D porous SWCNT network. FIG. 2B is a low magnification TEM image and FIG. 2C is a high resolution TEM image, both showing mostly isolated and intertwined SWCNTs 202 in aerogel 200.

Figure 3A:
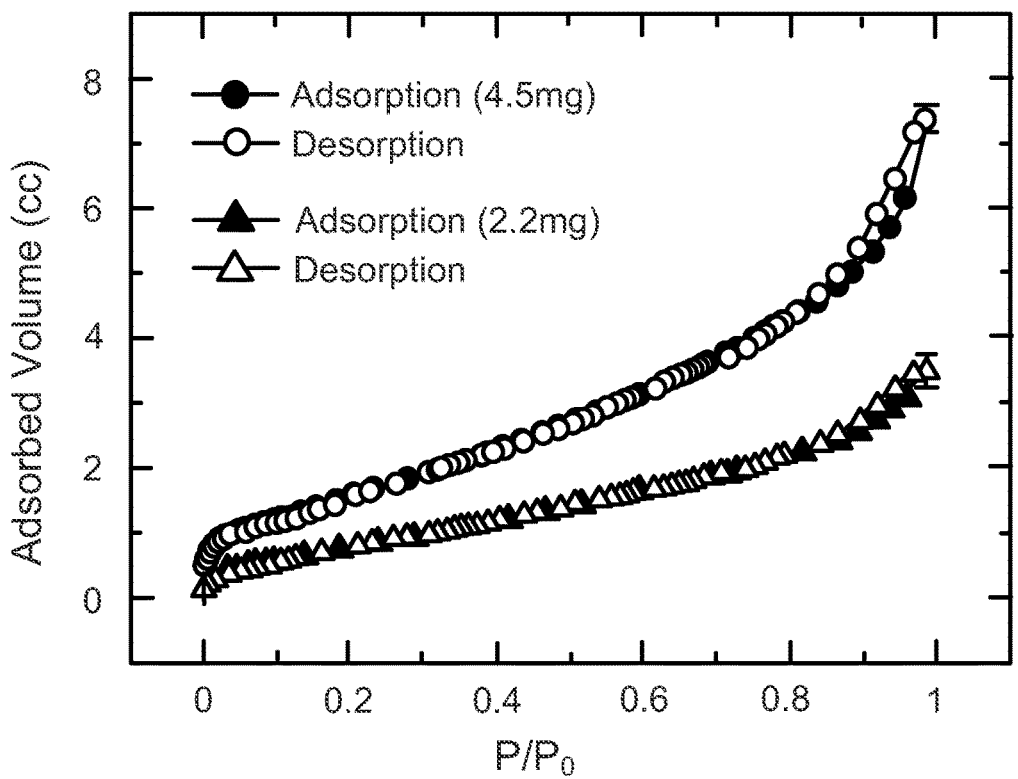
FIGS. 3A and 3B depict adsorption isotherms of aerogels formed as described in EXAMPLE 1.
Figure 3B:
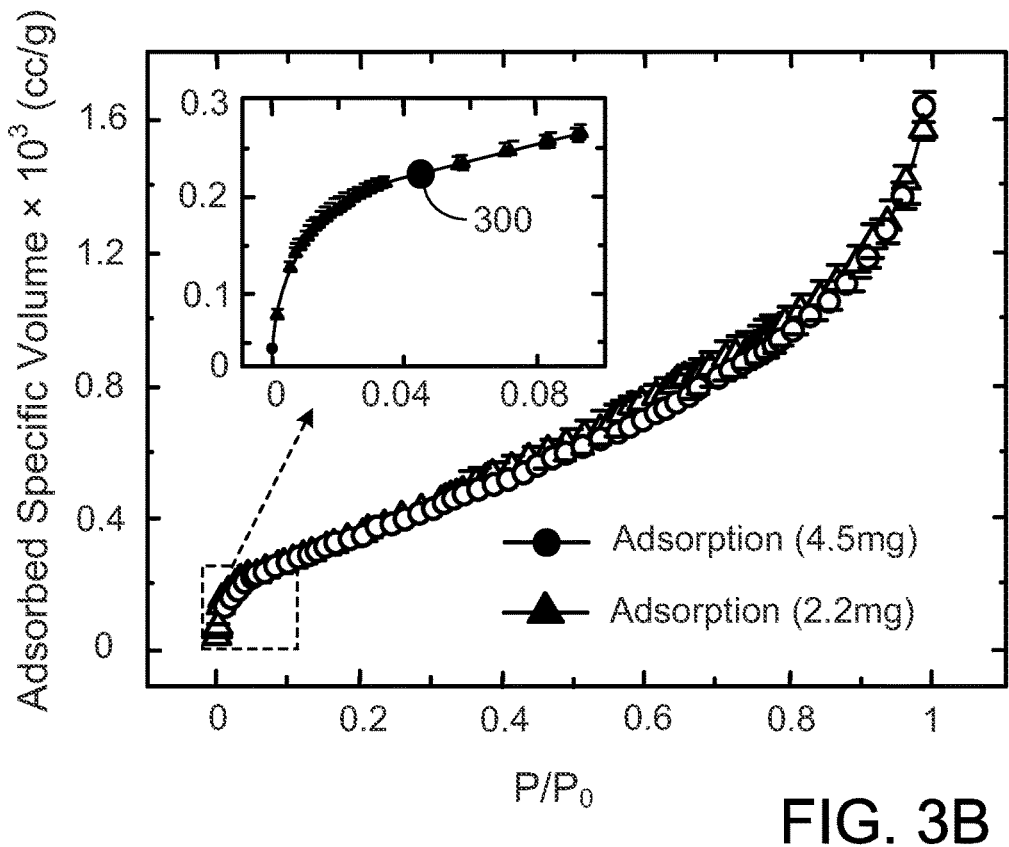

To quantify SSA, BET was performed on aerogels with density 9.9 mg/ml and different masses. FIGS. 3A and 3B show adsorption isotherms. FIG. 3A shows nitrogen adsorption isotherms at 77K measured using cylindrical aerogels with mass density of 9.9 mg/ml but different overall masses (2.2 mg and 4.5 mg). The adsorption hysteresis loop at high values of relative pressure $P/P_0$ (>0.8) in both isotherms suggests that the isotherms are of Type IV under IUPAC (1972) classification, where P is the equilibrium and $P_0$ the saturation pressure of the adsorbates at the adsorption temperature. Therefore, the isotherms indicate that the SWCNT aerogels were mesoporous, i.e., pores with diameters in the range of 2-50 nm. Additionally, the isotherm did not show excessive nitrogen uptake for $P/P_0$<0.05, which is indicative of micropores, or a sharp increase near $P/P_0$=1, which is indicative of macropores. As expected, the adsorbed volume increased with an increase in sample mass at any $P/P_0$. Thus, aerogels with similar density had similar pore structures.

To compare reproducibility of aerogel fabrication, aerogel pore sizes were compared by plotting the isotherms in a single master isotherm by normalizing adsorbed volume by the mass of the aerogel samples. As seen in FIG. 3B, the isotherms collapsed when adsorbed volume was normalized by the mass of the sample. Below $P/P_0$=0.1 (e.g., between about 0.0005 and about 0.1 as shown in the inset), the overlap between the adsorption isotherms was nearly perfect. The overlap between the isotherms remained fairly good for $P/P_0$>0.1. The gradual increase in the nitrogen adsorption at higher values of $P/P_0$ is an indication of multilayer formation on SWCNTs in the aerogel. Point 300 in the inset of FIG. 3B identifies the location ($P/P_0$~0.04), where linearity of the mid-region started and multilayer began to develop.

Figure 4A:
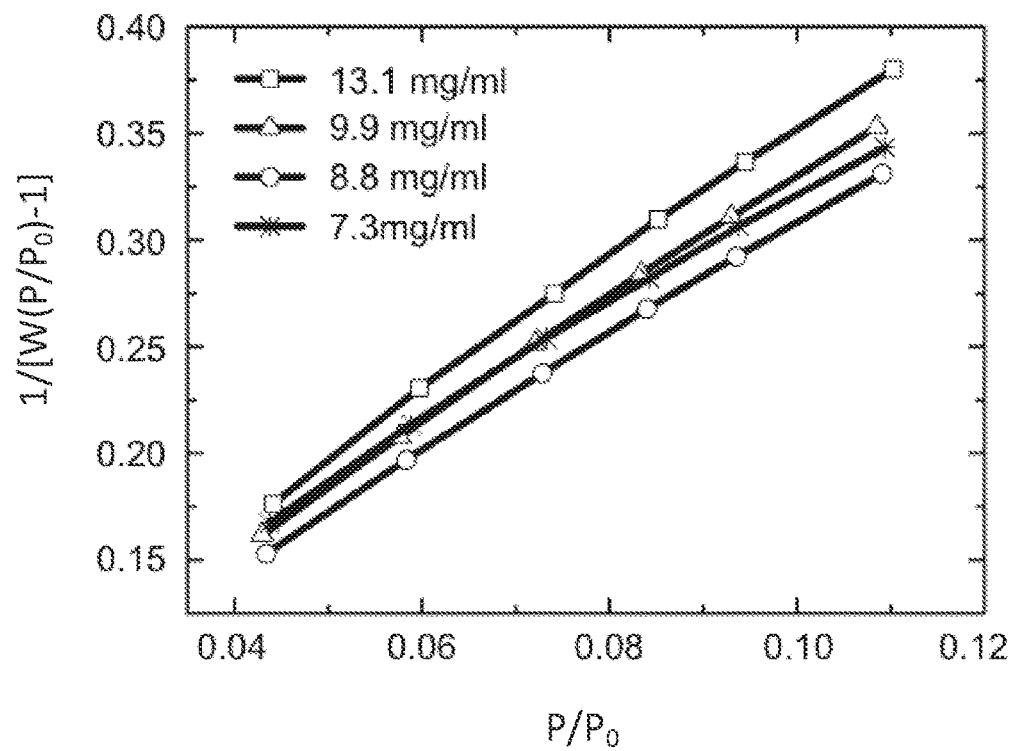
FIGS. 4A and 4B depict (Brunauer-Emmett-Teller) BET plots for specific surface area (SSA) calculations for aerogels formed as described in EXAMPLE 1.
Figure 4B:
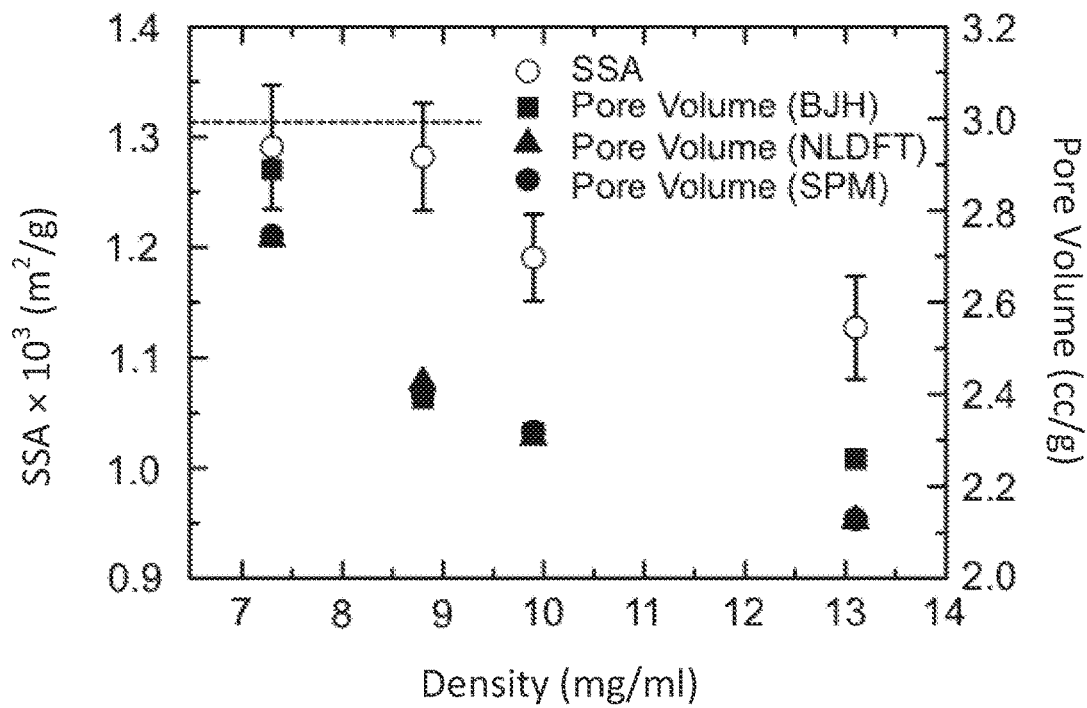

In general, the BET model is applied to fit nitrogen adsorption isotherms over a $P/P_0$ range of 0.05-0.35 to determine SSA. Since the BET method uses linear regression to fit data sets from isotherms, a good correlation coefficient is critical to this model. BET isotherms were used within the $P/P_0$ range of 0.04-0.11 to avoid overestimation of SSA. The BET instrument had sufficient resolution in the measurement of nitrogen adsorption at the low $P/P_0$, allowing the BET model to be applied to the isotherms to calculate SSA. FIGS. 4A and 4B show BET plots for SSA calculations. SSA was obtained from linear fittings through the isotherm data and via utilization of the BET model. FIG. 4A shows a plot of $1/(W[(P_0/P)-1])$ vs. $P/P_0$, where W is the mass of adsorbed nitrogen at a relative pressure $P/P_0$ per unit sample mass. By fitting a straight line through the data in FIG. 4A and by comparing to the BET equation, values for the y-intercept $i=1/(W_mC)$, slope $s=(C-1)/(W_mC)$, and $C=1/(i+s)$ were obtained. $W_m$ and SSA were then solved for. FIG. 4B shows SSA for the aerogels with four different densities. SSA and pore volume decreased with an increase in the aerogel density, possibly due to higher packing of SWCNTs. The dashed line in FIG. 4B indicates the theoretical limit of SSA for SWCNTs with closed ends (i.e., 1315 $m^2/g$). Aerogels with the lowest density of 7.3 mg/ml had a SSA of 1291 $m^2/g$, which is very close to theoretical limit for SWCNTs with closed-ends. SSA decreased with an increase in aerogel density, presumably because decreased pore sizes reduced the number of pores accessible for nitrogen adsorption.

Figure 5A:
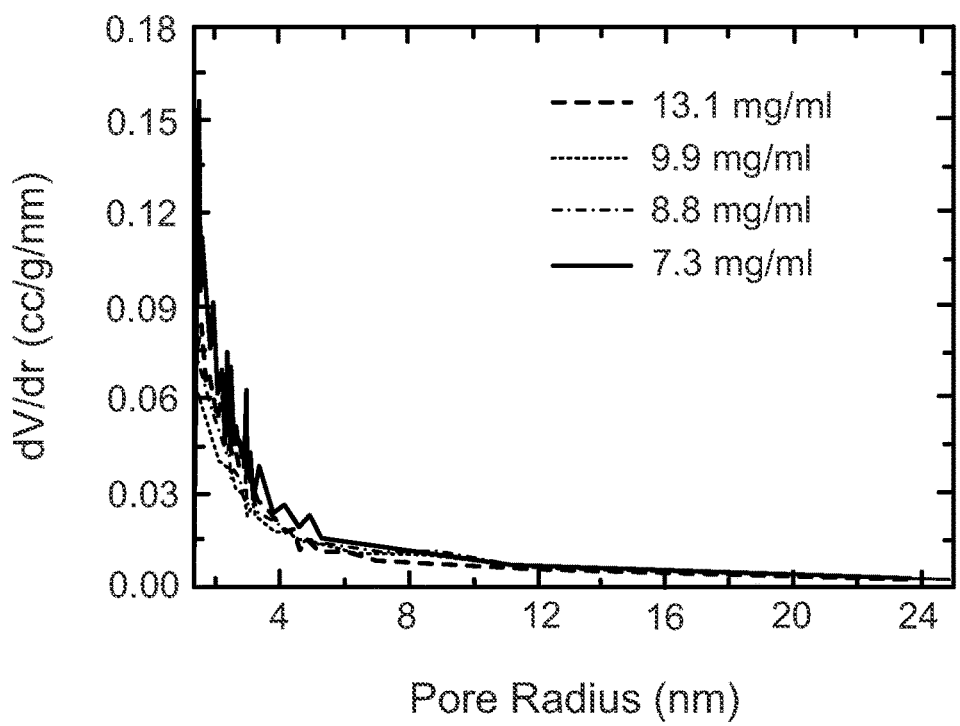
FIGS. 5A and 5B show pore size distributions (PSDs) for SWCNT aerogels formed as described in EXAMPLE 1.
Figure 5B:
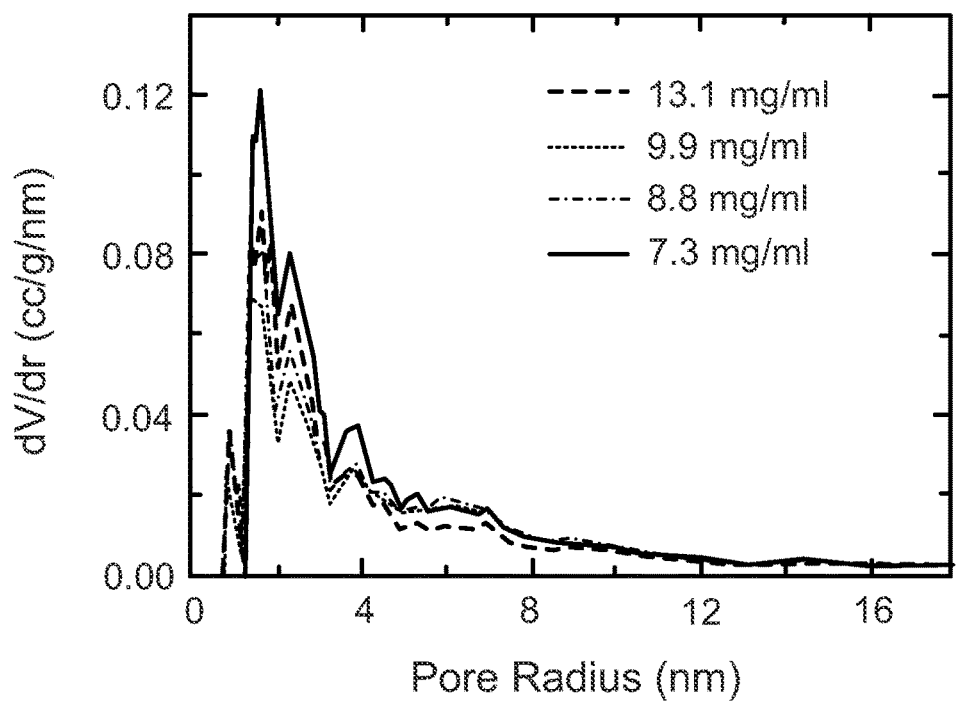

The pore size distribution (PSD) and pore shapes in the SWCNT aerogels were determined using two different methods, BJH and NLDFT. In FIGS. 5A and 5B, dV/dr vs r is plotted for aerogels with four different densities. For PSD analysis with BJH method, it is customary to utilize the desorption regime of the isotherm because it represents the lower free energy state compared to the adsorption branch of the isotherm. Since the nitrogen isotherms, SEM, and TEM suggested that the aerogels primarily had mesopores, BJH theory was first applied to the desorption regime of the isotherm to determine the pore volume, V, and the fraction of pore volume, dV/dr, as a function of pore radius, r, as shown in FIG. 5A. The pores within the aerogels had a diameter distribution ranging from 2.5 nm to 36 nm, with a majority of the pores having diameters in the range of 2.5-14 nm. The pore sizes were larger in lower density samples and decreased slightly with an increase in density, believed to be due to higher packing of SWCNTs within the aerogel. PSD using NLDFT method was then obtained, as shown in FIG. 5B, and compared to PSD obtained using BJH method. The slit-pore NLDFT model with carbon equilibrium at 77K provided the best fitting to the isotherm with ~3% fitting error. The PSD determined using BJH and NLDFT methods were in very good agreement with each other. However, while BJH method showed that the pores in the aerogels at all densities had ~100% mesopores, the NLDFT method suggested that the aerogels with densities of 8.8 and 9.9 mg/ml had a very small volume (2-3 vol %) of micropores and the rest mesopores, where micropores are generally understood to have a diameter of <2 nm, mesopores are generally understood to have a diameter within the range of 2-50 nm, and macropores are generally understood to have a diameter >50 nm. Pore volumes based on a single point method (SPM) were also calculated; pore volume calculated from SPM and NLDFT methods showed excellent agreement. None of the methods used suggested that the aerogels had any macropores. Further, both slit-pore and cylindrical pore models fit the data well, suggesting that the pores had non-spherical shapes.

Figure 6A:
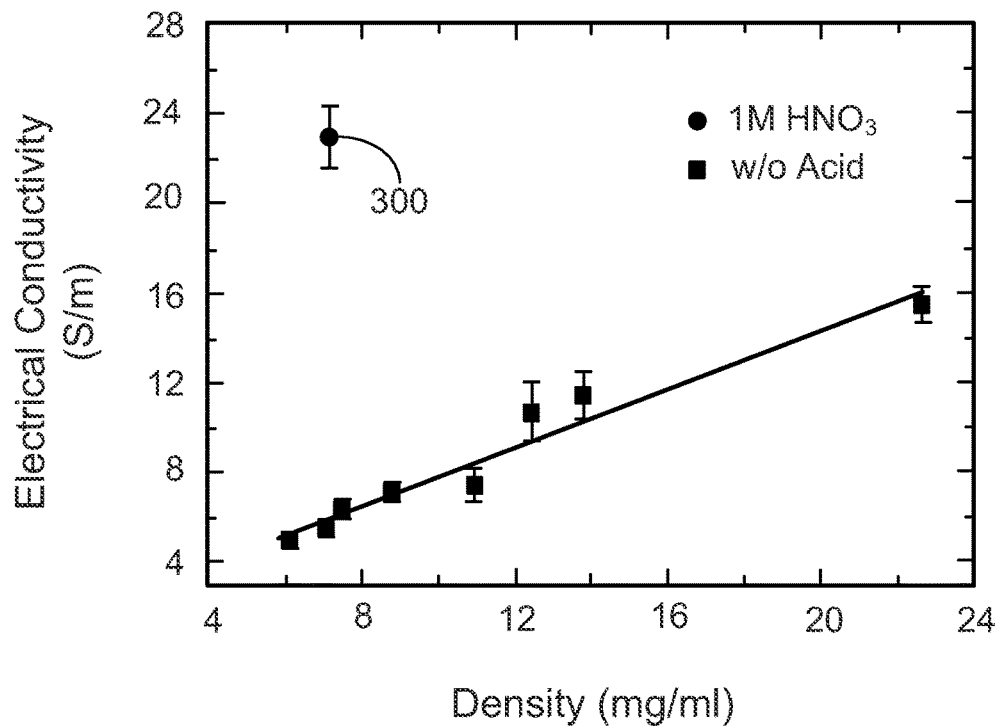
FIGS. 6A and 6B show electrical conductivities and Raman Spectra for SWCNT aerogels formed as described in EXAMPLE 1.
Figure 6B:
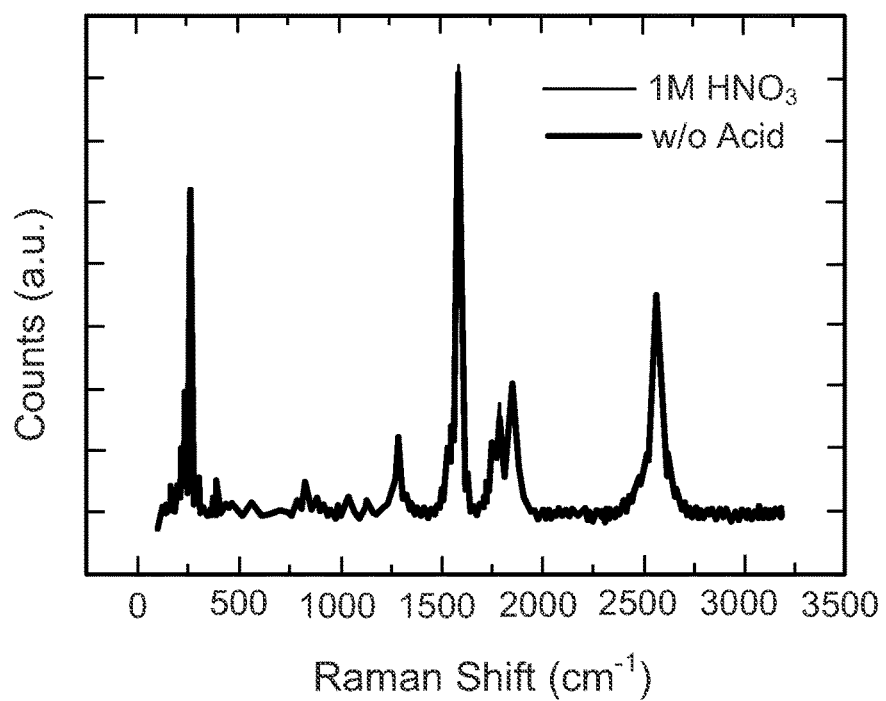

To determine if the fabrication method affected electrical conducting property of SWCNT aerogels, the density-dependent electrical conductivity of the aerogels at room temperature was determined. The electrical conductivity linearly increased from 5 S/m to 16 S/m with an increase in density as shown in FIG. 6A. It was also observed that washing the SWCNT elastic gels with low concentration nitric acid (1M $HNO_3$) followed by extensive rinsing with Millipore-filtered deionized water to remove all acid prior to fabrication of SWCNT aerogels increased the electrical conductivity by a factor of 4, as shown by point 600 in FIG. 6A. As seen in FIG. 6B, the Raman spectra from acid-washed SWCNT aerogel looked almost identical to non-acid-washed SWCNT aerogels, with an indistinguishable peak-shift of G-band and radial breathing modes and hardly any change to the amplitude of the D-band and G'-band, indicating that the acid wash did not damage or dope SWCNTs. It is believed that the acid wash removed residual surfactant and amorphous carbon (e.g., at junctions) that may be detrimental to or result in a decrease or reduction of electrical properties. The SSA, pore volume or PSD also showed an inappreciable difference between acid-washed vs. non-acid washed SWCNT aerogels.

As described in this example, aerogels with SWCNTs were fabricated, and the associated SSA, pore volume, and the pore size distribution within these aerogels were calculated. The SSA of the aerogels was very high, reaching a value of 1291 $m^2/g$, which is close to the theoretical limit. Aerogels with similar densities had similar pore structures. The pores had diameters ranging from 2.5-36 nm, with a majority of the pores having diameters within 2.5-14 nm. These SWCNTs aerogels with high porosity and controllable shapes and sizes may be backfilled with polymers to make composites for various electronic and energy applications.

Example 2

In this example, stretchable conductors are fabricated by backfilling SWCNT aerogels of various shapes and sizes formed with the elastomer poly(dimethylsiloxane) (PDMS). Since the SWCNT networks within the elastomers are created independently using SWCNT dispersions of isolated nanotubes as described in EXAMPLE 1, this fabrication process does not require dispersing of SWCNTs in the elastomer. As a result, the scheme can be used with a variety of elastomers to create elastic conductors. The resultant composites of SWCNT aerogel with PDMS are highly bendable, deformable, and stretchable. The SWCNT densities in the composite range from about 8 mg/ml to about 10 mg/ml and have electrical conductivities that range from about 70 S/m to about 108 S/m. The resistance of the elastic conductors remains the same under high bending strain and increases slightly (about 14%) at a tensile strain of 100%. Repeated cycling of stretch-release does not degrade the electrical conductivity of the elastic conductor. The transparency of the elastic conductors increases with a decrease in SWCNT aerogel thickness, with elastic conductors fabricated from 3 μm thick SWCNT aerogel have transmittance of about 93% in the visible light region.

To prepare the samples, a semiconducting CoMoCAT SWCNTs SG76 (diameter: 0.8±0.1 nm, length: 300 nm~2.3 micron; SouthWest NanoTechnologies Inc.) was used to fabricate SWCNT aerogels by the method described in EXAMPLE 1. Shapes and sizes of SWCNT aerogels are only dependent on those of the molds and the chamber size of the critical point dryer. SWCNT aerogels were then degassed under vacuum at 100° C. for 30 min to remove moisture on SWCNTs for better wetting between PDMS and SWCNT. PDMS (Sylgard 184, Dow Corning) was prepared by mixing base silicone gel with curing agent in a 10:1 weight ratio. A vacuum suction was used to backfill SWCNT aerogels with PDMS, and the backfilled SWCNT aerogel was then cured at 70° C. for 45 min. The final SWCNT-aerogel/PDMS composites have similar dimensions and sizes as those of bare SWCNT aerogels except for composite films manufactured using 3 μm thick SWCNT aerogels, where the films are sandwiched between two additional PDMS films with a thickness of about 200 μm for ease of handling. The electrodes were made using silver paste and copper wires, as shown in the insets in FIGS. 9B, 9D, and 9E. Due to poor wetting property of silver paste on PDMS, the silver paste was covered with cured PDMS for stable contacts. SEM was used to characterize the SWCNT-aerogel/PDMS composite films. Electrical properties were measured using 2-probe measurement (EC-Lab V10 and Fluke Ohmmeter).

Photographs of rectangular SWCNT-aerogel/PDMS composite film 700 of dimensions 10 mm×6 mm×400 μm (length×width×thickness) and wavy film 702 of thickness 1 mm are shown in FIGS. 7A and 7B, respectively. For ease of handling, base SWCNT aerogels of about 3 μm in thickness are sandwiched between two PDMS films, each having a thickness of about 200 μm, for ease of handling. FIG. 7C is an SEM image of a cross section of a composite material 704 formed as described in this example, illustrating that the PDMS fills the aerogels substantially completely, and does not induce any discernable inhomogeneity in SWCNT network distributions or voids during filling. As described herein, the stretchable conductor preparation method allows for the manufacture of conductors of various shapes and sizes, and overcomes the generally understood issue of segregation or agglomeration of an electrically conducting network within an elastic polymer.

Figure 8:
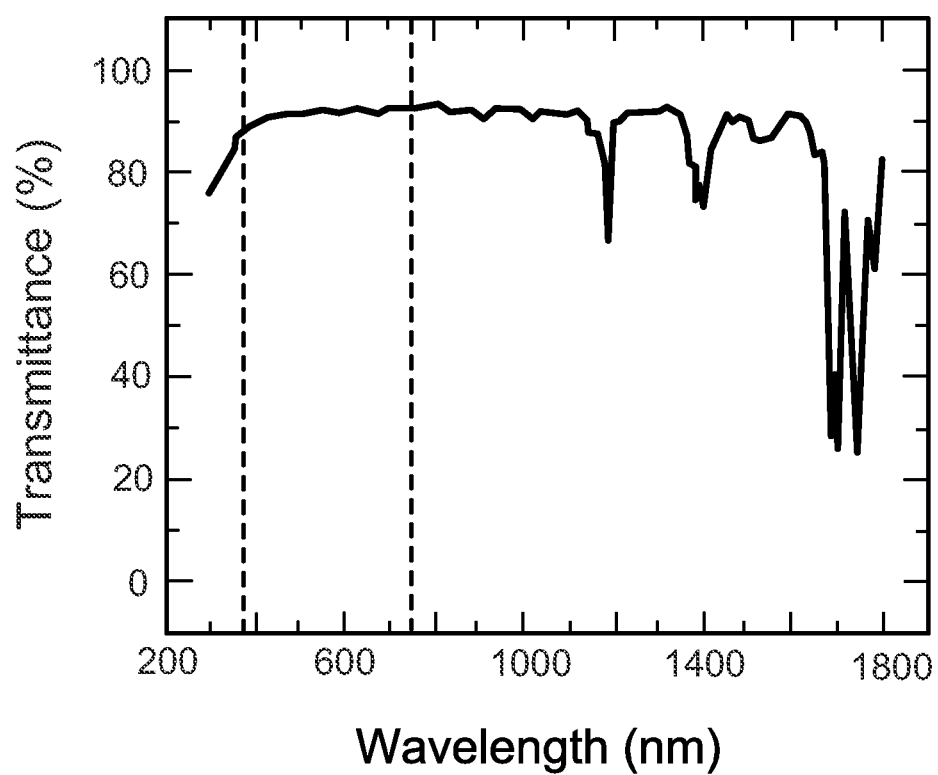
FIG. 8 shows transmittance (about 93% in the visible and about 90% in the near infrared) of a transparent composite film formed as described in EXAMPLE 2.

Since PDMS is transparent, the optical transparency of composite films fabricated in this example depends on the transparency of SWCNT aerogels used to manufacture them. As such, composite materials fabricated using thin SWCNT aerogels (thickness ≤30 μm) are typically transparent while thicker composite films are typically semi- and non-transparent. The thickness of the SWCNT aerogels may be verified in composites, for example, via SEM imaging of their cross-sections, and the transparency may be quantified, for example, using an ultraviolet-visible-NIR spectrometer (e.g., a CARY 5000), over a wavelength range of 300-1800 nm. The composite films that are made using 3 μm SWCNT aerogels demonstrate about 93% visible and about 90% near infrared (NIR) transmittance, as shown in FIG. 8.

A two-probe contact direct-current (dc) conductivity measurement method was used to determine the electrical conductivity of the composite films under tensile strains in the range of 0% to 100%, and reversibility as a function of stretch-release cycles. Composites made from 3 μm thick aerogels (hereafter referred to as transparent) and composites made from aerogels of 200 μm thickness (hereafter referred to as non-transparent) were assessed. The transparent SWCNT-aerogel/PDMS composite films have an initial sheet resistance of 4 kΩ/□ and the non-transparent composite films have an initial conductivity of 108 S/m at zero strain. The conductivities of the composite films are within 5% of the conductivities of the base SWCNT aerogels, which suggests that PDMS does not degrade the contacts between the SWCNTs within the 3D nanotube networks. Hereafter, the initial resistance of composite films with zero strain is referred to as $R_0$.

Figure 9A:
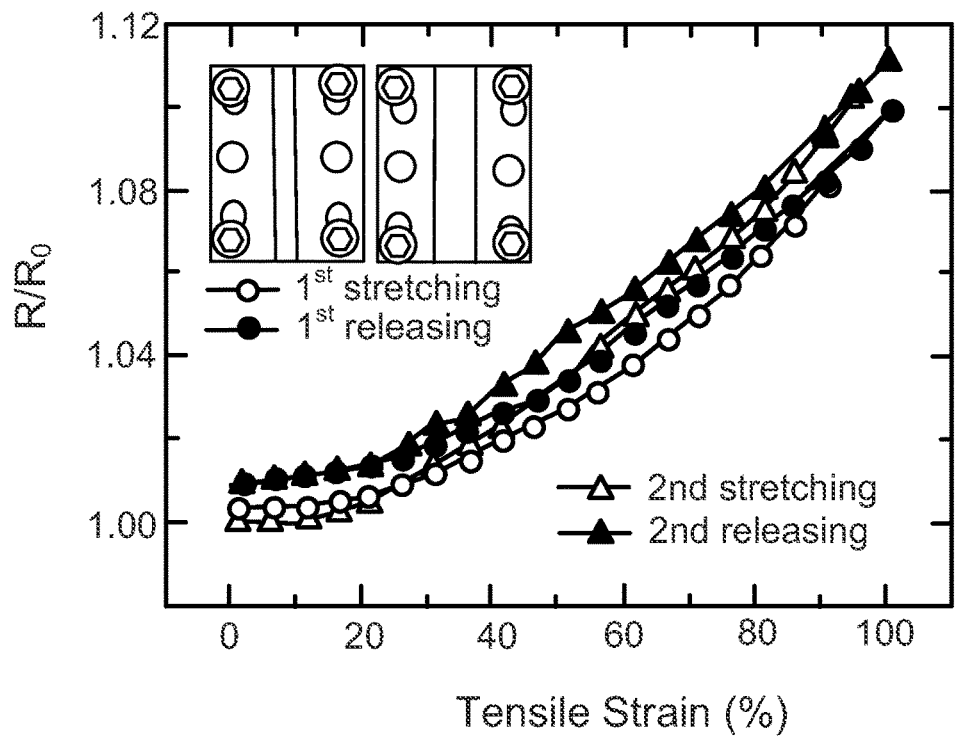
FIGS. 9A-9E show normalized resistance of SWCNT-aerogel/PDMS composite films formed as described in EXAMPLE 2 as a function of uniaxial tensile strain along the direction of conduction.
Figure 9B:
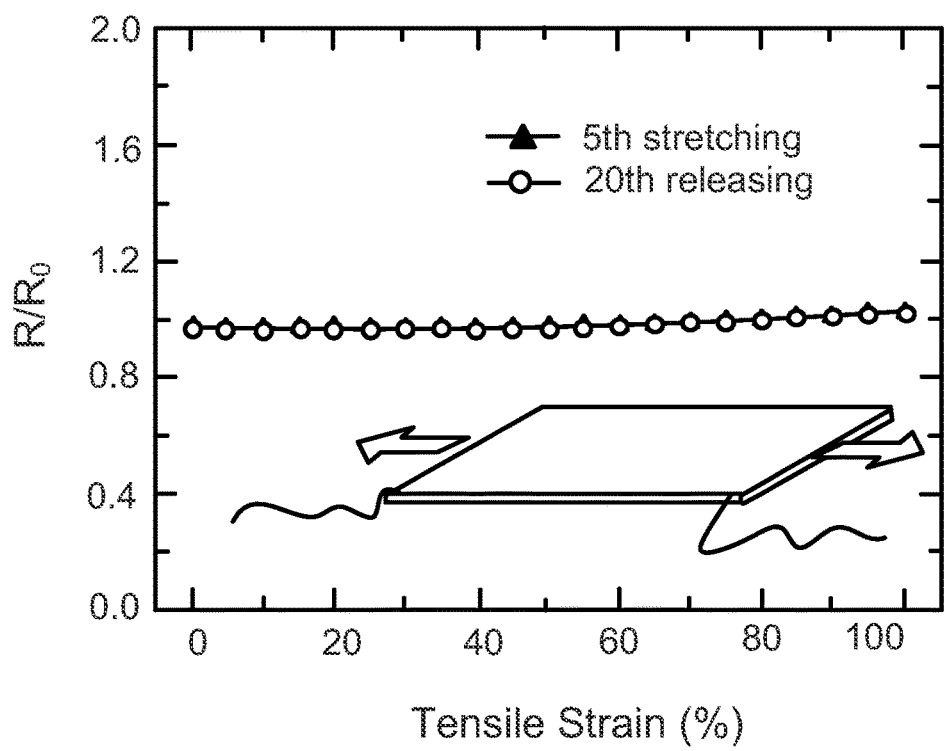
Figure 9C:
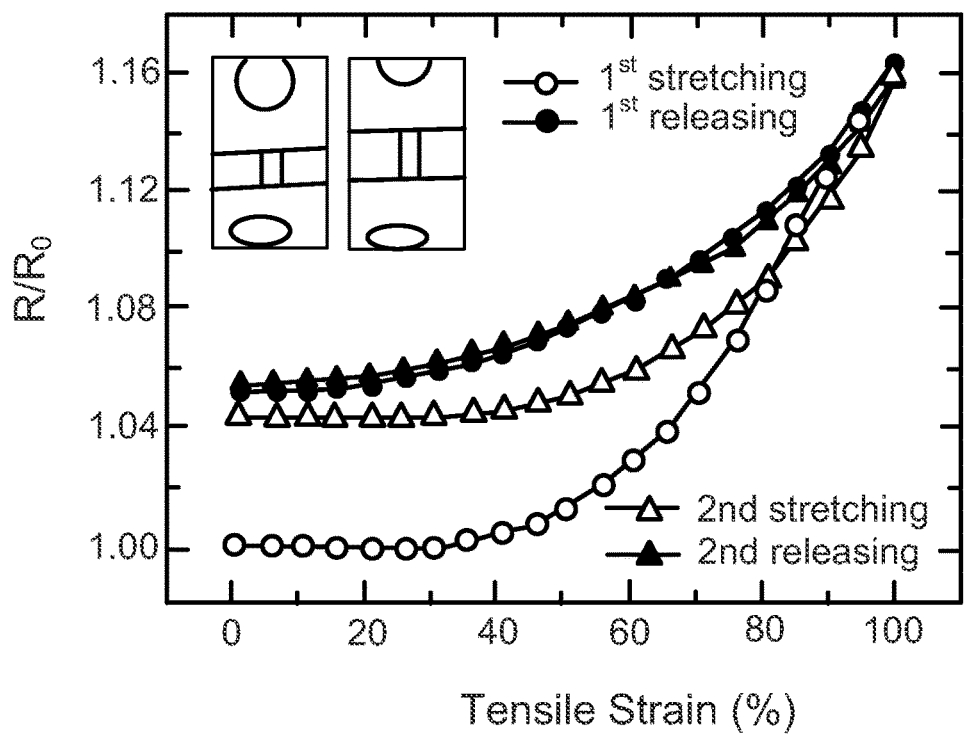

The SWCNT-aerogel/PDMS composite materials were stretched along the conduction direction using a high precision optical stage, as shown in the insets in FIGS. 9A and 9C. Measurements were conducted as described in ASTM D882-10 (Standard Test Method for Tensile Properties of Thin Plastic Sheeting), which is incorporated by reference herein, with the exception that the samples were of the shapes and sizes described herein. The composite films were clamped to the stages with equal pressure without applying any force to the contacts. All the measured I-V curves are linear in the range measured, denoting stable electrical contacts along the elastic conductor. All the composite films remain conductive up to a tensile strain of 250%, limited at least in part by the deformability of the PDMS. During the first stretching, the normalized resistance, $R/R_0$, of the composite films increases nearly linearly as the tensile strain increases from 0% to 100% (shown in FIGS. 9A and 9C), thought to be due to a decrease in the contact area between the SWCNTs during stretching. The increase in $R/R_0$ at maximum strain is about 11% for transparent composite films (FIG. 9A) and about 16% for non-transparent composite films (FIG. 9C); these values are very low compared to behavior in graphene and CNT based stretchable conductors.

Since the SWCNT aerogel networks are pre-formed, the nanotubes within the percolated 3D network may slide past one other without losing contact while being supported by PDMS during stretching. However, about 1% loss is observed in conductivity for transparent films (FIG. 9A) and about 7% loss for non-transparent films (FIG. 9B) as the materials returned back to its unstrained state, indicating broken contacts between the SWCNTs during the stretching cycle. Additional recovery was observed in the conductivity within the 15 minutes after the composite films returned to its unstrained state, thought to be due to slow relaxation of the PDMS encaged SWCNT network. During the second cycle of stretching, the increase in $R/R_0$ was similar for transparent composite films but was much smaller for non-transparent composite films (about 11%). The loss in conductivity for transparent composite films after the release cycle is similar to the first cycle (about 1%) but is only about 2% for non-transparent composite films.

Figure 9D:
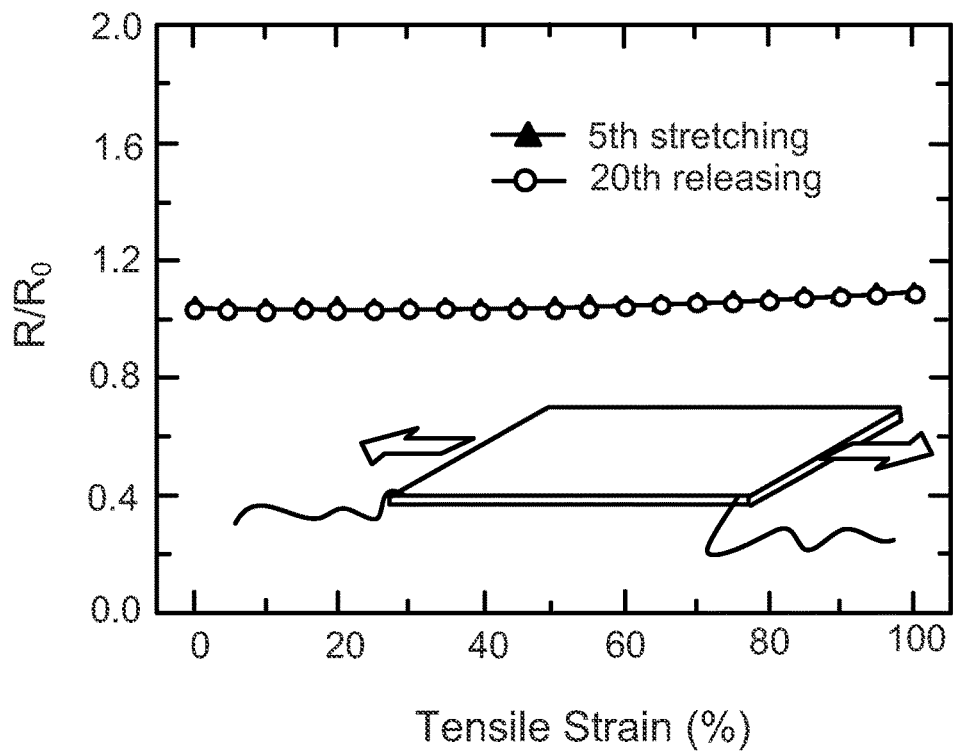
Figure 9E:
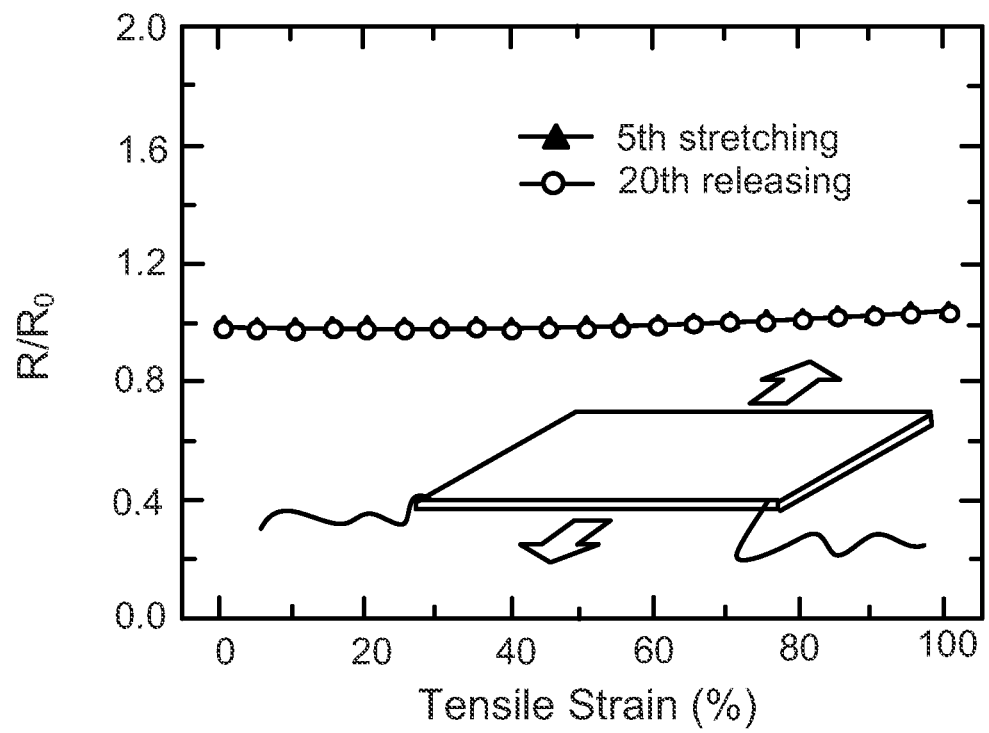

The SWCNT-aerogel/PDMS composite films reach a stable $R/R_0$ after 4 stretch-release cycles and show excellent reversibility thereafter. The resistance remains almost constant during the fifth and twentieth stretching cycles for tensile strain up to 100%, as shown in FIGS. 9B and 9D (insets depict stretching of the SWCNT-aerogel/PDMS composite films). Since nanotubes are distributed isotropically in the aerogel, similar conducting behavior is observed normal to the stretching direction, as shown in FIG. 9E (inset depicts stretching of the SWCNT-aerogel/PDMS composite films).

Figure 10:
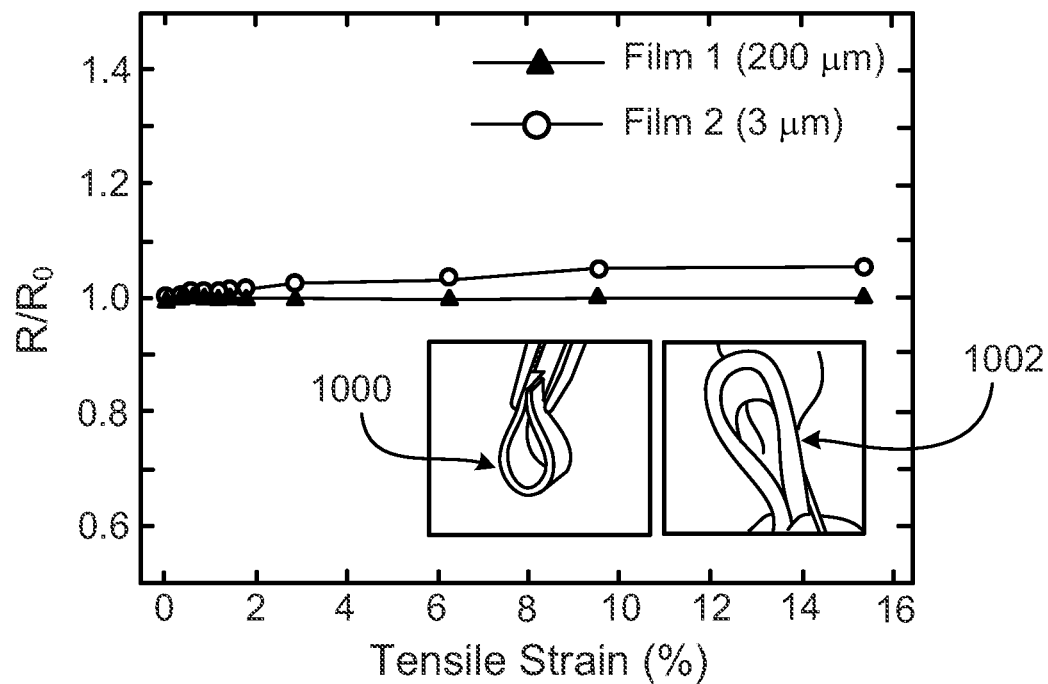
FIG. 10 illustrates normalized resistance as a function of radius of curvature for transparent (3 µm) and non-transparent (200 µm) SWCNT-aerogel/PDMS composite films formed as described in EXAMPLE 2. The left and right insets show non-transparent and transparent SWCNT-aerogel/PDMS composite films, respectively, bent by 180° with a tweezer-like instrument.

One of the striking characteristics of the SWCNT-aerogel/PDMS composite films formed as described herein is a negligible dependence of their electrical conductivity on bending deformations. By way of demonstration, a curved glass substrate with a known curvature was used to gradually bend the composite films up to a radius of curvature (H) of 15.3 $cm^{-1}$, and the electrical conductivity was measured. In FIG. 10, $R/R_0$ is shown to change less than 0.1% with a change in H. This behavior is possibly due to the isotropic structure of SWCNT aerogel and short mean length of individual SWCNTs, which allows it to withstand multi-axial loading and elongation with only minor change in the electrical properties. The SWCNT-aerogel/PDMS composite materials remain robust after repeated stretch-release cycles and bending. SEM imaging of the cross-sections of the composite films did not show any noticeable morphological changes due to stretch-release cycles and bending. The left and right insets show non-transparent and transparent SWCNT-aerogel/PDMS composite films 1000 and 1002, respectively, bent by 180° with a tweezer-like instrument.

Example 3

This Example describes a new class of superelastic, compressible and porous materials: graphene (Gr) coated carbon nanotube (CNT) aerogels. The aerogels may be single-wall, double-wall, multi-wall, or any combination thereof. Small amounts of graphene transform fragile CNT networks into superelastic networks while maintaining the strength, ultracompressibility, high porosity, and conductivity of CNT networks. The Gr-coated CNT aerogels recover their original shape extremely quickly after compression-release. This methodology of graphene addition to introduce superelasticity to CNT networks coupled with inherent flexibility of aerogel synthesis in manipulating material shapes makes these materials attractive for dampers, electrodes, sieves, artificial muscles, scaffolds for composites, complex mechanical structures as well as other applications.

These superelastic, porous structures are fabricated by uniformly coating pre-formed single wall carbon nanotube (SWCNT) aerogels (formed, e.g., as described in EXAMPLE 1) with a polyacrylonitrile (PAN) polymer and then converting PAN into multilayer graphene (Gr) via a two-step pyrolysis process. The small amounts of graphene are shown to transform fragile SWCNT networks into superelastic networks while maintaining the strength, ultracompressibility, high porosity and conductivity of SWCNT networks. The Gr-coated SWCNT aerogels resist fatigue and recover their original shape very quickly at a rate of at least 672 mm/min after removal of load. The mechanism of elasticity in SWCNT networks can be applied to other CNT-based porous structure since they are as synthesized CNT forests, and graphene generation is ubiquitous in CNT synthesis. The methodology of graphene addition to introduce superelasticity to SWCNT networks coupled with inherent flexibility of aerogel synthesis in manipulating material shapes makes these materials attractive for dampers, electrodes, sieves, artificial muscles, scaffolds for composites and complex mechanical structures.

Gr-coated SWCNT aerogels described herein are ultralight with density (p) of 14.0 mg/ml with 5.2 mg/ml of graphene and the rest SWCNTs. The porosity of these open-cell aerogels is greater than 98%. The Gr-coated SWCNT aerogels do not show mechanical failure or degradation with >90% static compression or large cyclic, uniaxial compressive strain ($\epsilon$) of about a million cycles at $\epsilon=2\%$ at a rate of 100 Hz or after about 2000 cycles at $\epsilon=60\%$ at a rate of 1 Hz. By combining results from frequency ($\omega$) dependent compressive storage (E') and loss (E") moduli with electrical resistance (R) under $\epsilon$, the role of graphene in transforming delicate SWCNT aerogels into superelastic porous materials is elucidated. The introduction of graphene to a pre-formed SWCNT aerogel network stabilizes existing SWCNT nodes while retaining the SWCNT aerogel compressibility. The graphene also inhibits new SWCNT nodes from forming when the aerogel is strained, so the original shape is recovered (e.g., completely recovered) quickly after compression-release.

The SWCNTs are purified according to methods generally known in the art, such as the method described in D. E. Johnston et al., Nat. Mater. 4, 589 (2005), which is incorporated by reference herein. The purified SWCNTs are suspended in Millipore-filtered deionized water to a concentration of 0.1 wt % using sodium dodecylbenzene sulfonate (SDBS) surfactant (e.g., Acros Organics) at a SWCNT:SDBS ratio of 1:10; different SWCNT:SDBS ratio did not result in any noticeable difference in aerogel quality. The solution is sonicated using a tip sonicator (e.g., Thermo Fisher 500) for 2 hrs at 60 W followed by centrifugation at 21,000 g for 30 min (e.g., Beckman Coulter Allegra 25R) to sediment SWCNT bundles. The SWCNT concentration in the supernatant is determined using optical absorbance (e.g., Varian Cary 5000 ultraviolet-visible-near infrared spectrometer) with an extinction coefficient of 2.6 (absorbance-ml)/(mg-mm) at 930 nm and the Lambert-Beer equation. The SWCNT dispersion shows sharp van Hove transition peaks in the absorption and fluorescence spectra, indicating that the purification and dispersion process did not cut or open the ends of the SWCNTs. The supernatant is then concentrated by evaporating the water to a final SWCNT concentration of 3.5 to 4.5 mg/ml. The concentrated SWCNT suspension is degassed to remove bubbles. The suspension is then poured into cylindrical molds; bubbles significantly degrade the mechanical stability of aerogels. The SWCNT suspension forms a wet elastic gel within 12 hrs due to van der Waals interactions between the SWCNTs.

To remove SDBS, the wet gel is washed with 1 M nitric acid at 50° C. for 20 minutes; the acid wash does not damage SWCNTs. Note that surfactant removal by hot water induces a significant shrinkage of SWCNT wet gel, and is avoided. The acid-washed SWCNT wet gels are neutralized by washing with deionized water until pH equilibrated to about 7. To create the SWCNT aerogel, the water is exchanged with ethanol by sequentially soaking the wet gel in ethanol baths (ranging from 20-100 vol % anhydrous ethanol) with a step size of 20% for 48 hrs at room temperature. The ethanol is then removed from the wet gel via critical-point-drying (CPD) (e.g., Autosamdri 815, Tousimis). Energy dispersive X-ray (EDX) spectroscopy shows that no sulfur present in the SWCNT aerogels; the quantitative analysis limit is <1 wt %. Since sulfur is a component of SDBS, this suggests that the final SWCNT aerogels are substantially free of surfactant, or surfactant-free. A shrinkage of about 10% is observed along each dimension of the SWCNT aerogels compared to the dimensions of the wet elastic gels. In one example, the SWCNT aerogels have dimensions of 3:33× 2:84 mm (diameter×length) and a mass density, calculated based on the mass and dimensions of the final aerogels, of 8.8 mg/ml.

To create Gr-coated SWCNT aerogels, surfactant-free SWCNT wet gels in water and polyacrylonitrile (PAN) are used as precursors for the synthesis of graphene sheets on nanotube surfaces. Water is exchanged in SWCNT wet gels with dimethylformamide (DMF) over 18 hrs (fresh DMF every 6 hrs) and then SWCNT wet gels are soaked in 0.5 wt % PAN (M.W. 15,000 g/mole with polydispersity index of 1.10; low M.W. PAN for effective infiltration of SWCNT aerogel pores) solution in DMF at 50° C. for 12 hrs to homogeneously coat the SWCNT wet gels with PAN polymer. Subsequently, DMF is exchanged with anhydrous ethanol over 32 hrs (fresh ethanol every 8 hrs) and critical point dry (CPD) samples to create PAN coated SWCNT aerogels. In contrast to SWCNT aerogels, the PAN-coated SWCNT aerogels have the same dimensions as the PAN-coated SWCNT wet gels. To convert PAN into graphene, PAN-coated SWCNT aerogels are degassed at 140° C. under vacuum ($7.4\times10^{-7}$ mbar) for 1.5 hrs. The samples are then heated at 210° C. in argon (Ar) gas at 1 atm for 1.5 hrs to convert the PAN polymer into a condensed heterocyclic ring structure. After this step, the aerogel shrinkage is observed by 12% in all dimensions compared to PAN-coated SWCNT aerogel due to entropic shrinkage of PAN at 210° C. The samples are then pyrolyzed at 1010° C. in Ar gas at 1 atm for 1.5 hrs to change the PAN-derived condensed heterocyclic ring structure into graphene to create Gr-coated SWCNT aerogels. The dimensions of Gr-coated SWCNT aerogels are 3.3×2.8 mm (diameter×length) and the density is 14.0 mg/mL with 5.2 mg/mL of graphene and the rest SWCNTs.

Figure 11A:
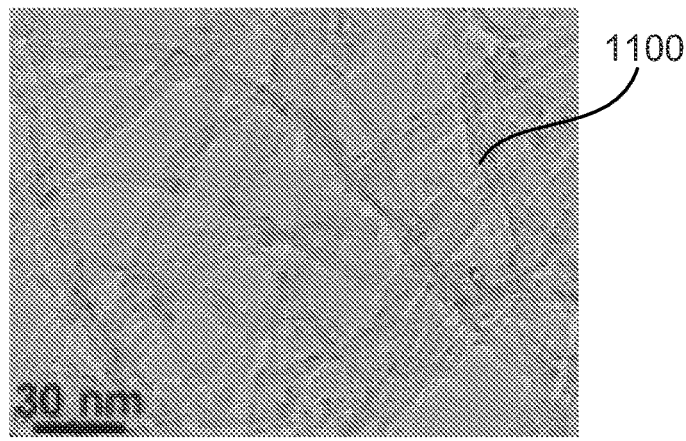
FIGS. 11A-11C show microstructures of graphene-coated (Gr-coated) SWCNT aerogels formed according to EXAMPLE 3.
Figure 11B:
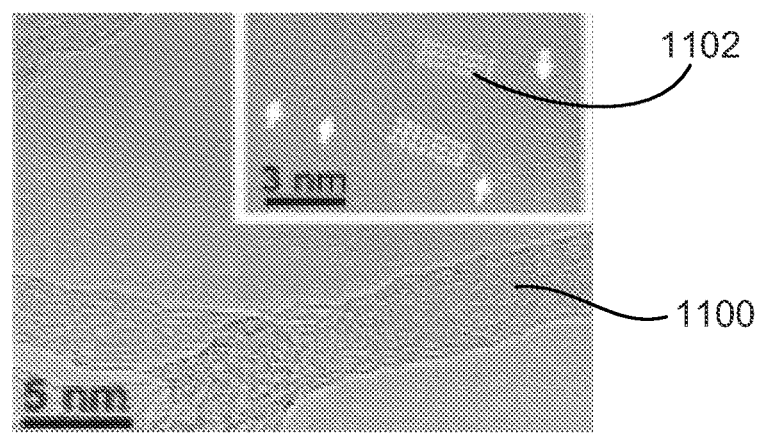
Figure 11C:
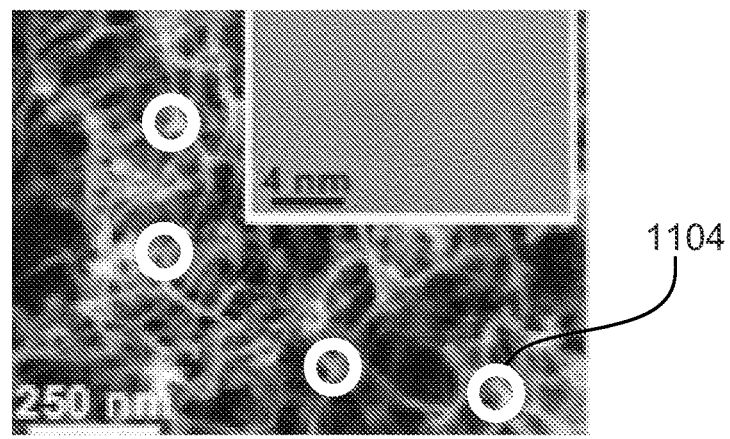

TEM and SEM are used to image the Gr-coated porous network of SWCNTs. FIG. 11A is a low resolution TEM (e.g., Tecnai F20 at 200 kV) image of Gr-coated SWCNTs aerogels shows networks of SWCNTs 1100 uniformly coated with graphene without noticeable structural change to the underlying SWCNT networks. The graphene coating increases SWCNT diameter from about 1 nm to 3-5 nm. FIG. 11B is a high resolution TEM (HRTEM) (e.g., FEI Titan 83 at 300 kV) imaging of the SWCNTs 1100 shows a coating of highly crystalline graphene platelets 1102 with average dimensions of about 3 nm. Graphene flakes organize parallel to SWCNT surfaces with visible vacancies within and at the boundaries between graphene flakes, identified with arrows in the inset of FIG. 11B. FIG. 11C is a high resolution SEM and HRTEM (inset) showing a larger concentration of graphene flakes at nodes 1104 between SWCNTs.

Figure 11D:
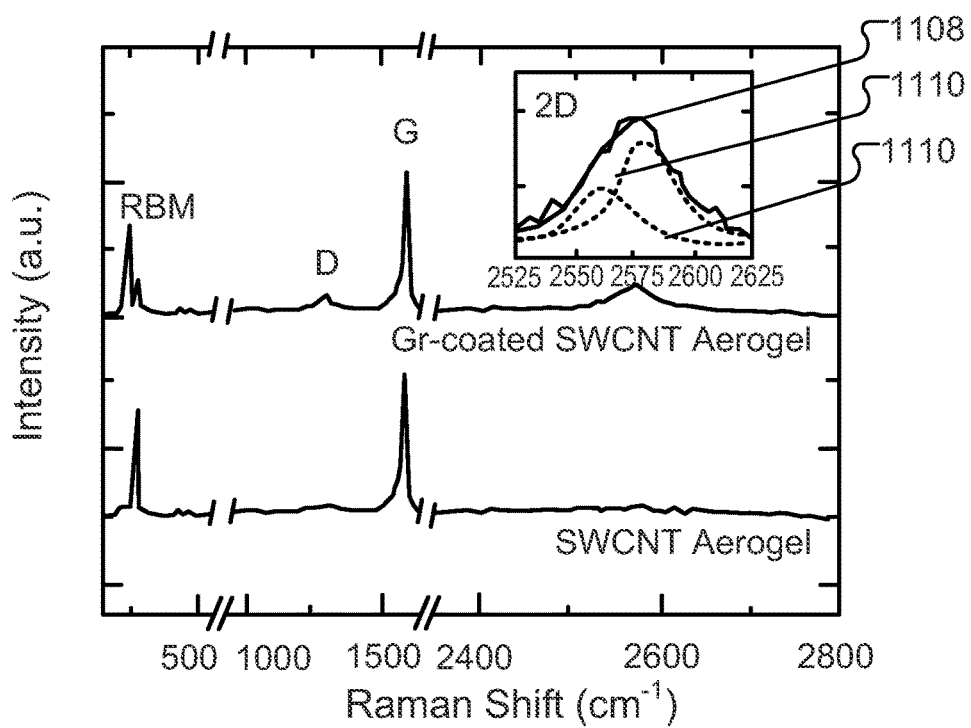
FIG. 11D shows radial breathing modes (RBM) of the Raman spectra from Gr-coated SWCNT aerogels.
Figure 11E:
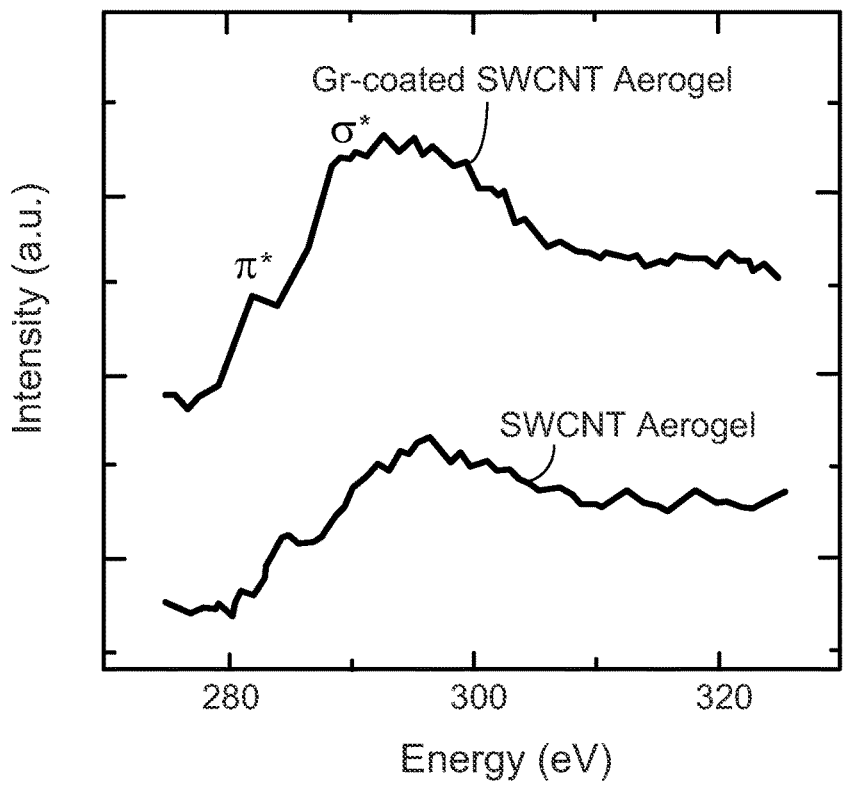
FIG. 11E shows the electron energy loss spectroscopy (EELS) spectra from a Gr-coated SWCNT aerogel showing peaks at 285 eV and 291 eV from is to $\pi^*$ and $\sigma^*$ electron transitions, respectively, characteristic of $sp^2$ bonded structures. Spectra from Gr-coated SWCNT aerogels were shifted from the SWCNT aerogel spectra for clarity.

The presence of graphene on SWCNT is confirmed using Raman spectroscopy and electron energy loss spectroscopy (EELS), with corresponding spectra shown in FIGS. 11D and 11E, respectively. The Raman spectra from both SWCNT aerogels and Gr-coated SWCNT aerogels shows the presence of radial breathing modes (RBM in FIG. 11D), a signature of SWCNTs, suggesting that SWCNTs are chemically unaffected by the graphene coating or coating process. The 2D band (also known as G' band) in the Raman spectra near 2560 $cm^{-1}$, a characteristic of graphene structures, shows an upshift of 17 $cm^{-1}$ and an increase of 350% in the band intensity for Gr-coated SWCNT aerogels compared to that of SWCNT aerogel (FIG. 11D). The data collection and data analysis was performed using WiRE software (e.g., Renishaw). Each Raman spectrum was then normalized by its G-band intensity.

Typically, graphene multilayers formed by pyrolysis of PAN have turbostratic structures, and the 2D band typically has a non-Lorentzian line-shape. However, the 2D band line-profile from Gr-coated SWCNT aerogels is fitted (plot 1108) with superposition of two Lorentzians (plots 1110) suggesting that the graphene layers are crystalline, possibly from the SWCNT wall acting as a template for graphene crystallization (inset of FIG. 11D). The Raman spectra from Gr-coated SWCNT aerogels also shows slight increase in the D-band intensity, a measure of disorder in carbon materials (FIG. 11D). The EELS spectra from Gr-coated SWCNT aerogels shows peaks at 285 eV and 291 eV which correspond to electron transitions from the 1s electronic states (or K-shell) to $\pi^*$ and $\sigma^*$ states, respectively, characteristic of the $sp^2$ bonded structure. This corroborates both the structural integrity of SWCNTs with no damage during fabrication and the presence of graphene layers on SWCNTs (FIG. 11E).

Figure 12A:
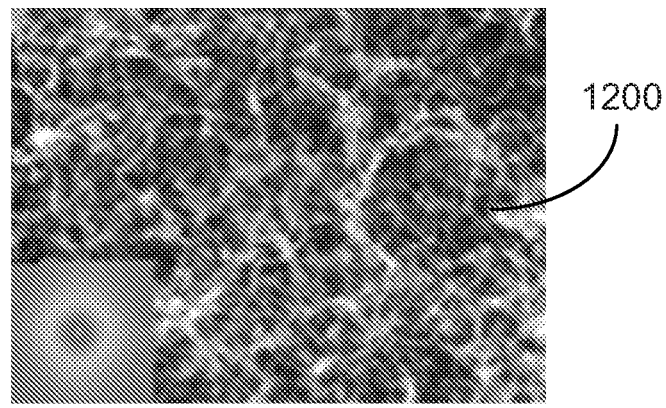
FIGS. 12A-12C present reorganization of Gr-coated SWCNTs under compression.
Figure 12B:
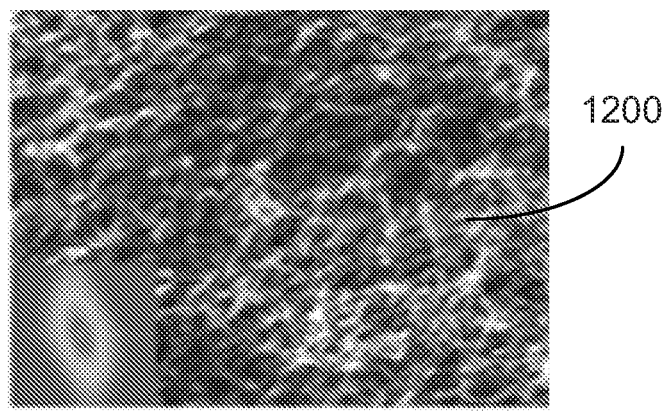
Figure 12C:
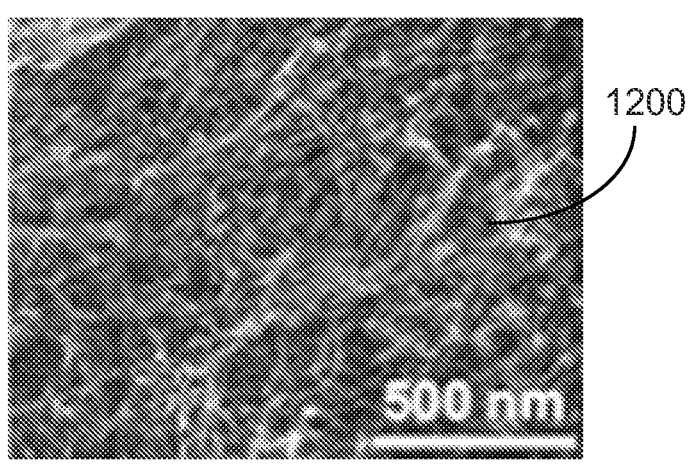

The structural reorganization and alignment of Gr-coated SWCNTs within the aerogels at various $\epsilon$ are determined by calculating the orientational order parameter (S) via fast fourier transform (FFT) of high resolution SEM images. S=0 for completely isotropic systems and S=1 for perfectly aligned systems. At $\epsilon$=0%, Gr-coated SWCNTs 1200 have an isotropic orientation within the aerogels (FIG. 12A) with an FFT suggesting S 0.06 (inset of FIG. 12A). Gr-coated SWCNTs align with application of compressive strains with arbitrary direction (versus horizontal) because of the surface roughness of the aerogels. For example, at $\epsilon$=40%, alignment is visible in the SEM images (FIG. 12B), and an FFT of the SEM image shows anisotropic intensity distribution (inset of FIG. 12B) with S reaching about 0.51. At $\epsilon$=80%, the SEM images show a densely packed, parallel organization (FIG. 12C).

Figure 13A:
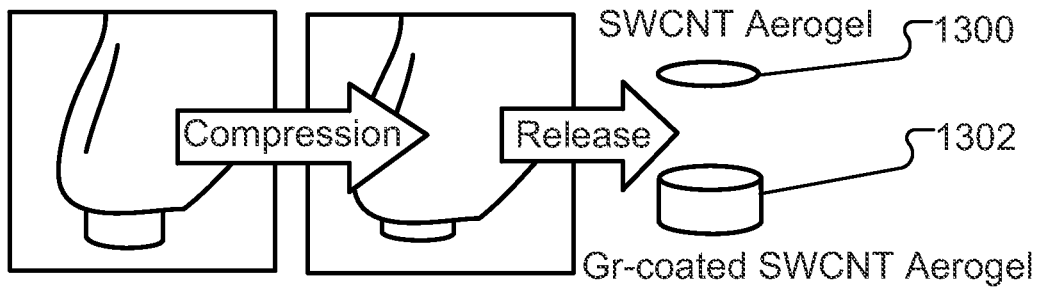
FIGS. 13A-13D show mechanical properties of Gr-coated SWCNT aerogels.

After the strained structure of Gr-coated SWCNT aerogels was determined, the mechanical properties including compressive stress ($\sigma$) and fatigue as a function of $\epsilon$ were characterized using dynamic mechanical analysis (DMA). The high porosity (>98%) of both SWCNT and Gr-coated SWCNT aerogels allows compression of about 90%. SWCNT aerogels are extremely fragile and tend to deform permanently when compressed for $\epsilon$>10%. FIG. 13A shows an image of a permanently collapsed SWCNT aerogel 1300 after about 90% compression. In contrast, the Gr-coated SWCNT aerogel 1302 completely recovers its original shape with no mechanical failure under similar compression.

The mechanical properties of aerogels fabricated as described in this example were measured, including compressive stress ($\sigma$) as a function of compressive strain ($\epsilon$), fatigue measurements versus $\epsilon$, and storage (E') and loss (E") moduli as a function of frequency ($\omega$) at room temperature using, for example, a Bose ElectroForce 3200 DMA instrument. The cylindrical aerogel samples were loaded between two compression heads with the top head oscillating along vertical direction to apply uniaxial compression and release on the sample. Measurements on $\sigma$ as a function of $\epsilon$ are performed at a fixed $\omega$=0.5 Hz with a pre-stress of 0.04 MPa (which corresponds to about 6% pre-strain) to make a uniform flat contact between the compression heads and the sample and to prevent slipping of the sample. For SWCNT aerogels, one measurement of $\sigma$ is collected along loading direction per sample at $\epsilon$=70% because they permanently deform when uniaxially compressed for $\epsilon$>about 10%. In contrast, Gr-coated SWCNT aerogels are elastic and $\sigma$ is measured for loading-unloading cycles versus $\epsilon$ from 5% to 80%; to maintain constant $\omega$ for different $\epsilon$, the top head travels at a speed of 8 mm/min ($\epsilon$=5%) to 128 mm/min ($\epsilon$=70%). At each $\epsilon$, 20 cycles were collected and averaged. No noticeable change was observed in the prestress between cycles at a fixed $\epsilon$ for Gr-coated SWCNT aerogels, but a change of ~0.0075 MPa is seen between measurements at different $\epsilon$, except for 5% and 10% strains due to stress relaxation or creep. However, the prestress value never decreased below 0, suggesting that the DMA measurements did not cause permanent deformations.

At any stress, there was no significant change in $\sigma$ between the first 20 loading-unloading cycles and the error in $\sigma$ is about 0.3% for all $\epsilon$ except for $\epsilon$=5% for which the errors is 0.6%. Fatigue measurements are performed by strain-controlled cyclic loading-unloading of $\sigma$ at $\epsilon$=60% at $\omega$=1 Hz for 2,000 cycles with prestress of 11 KPa (which corresponds to about 2% prestrain) and at $\epsilon$=2% at $\omega$=100 Hz with a 4% prestrain for $10^6$ cycles. In fatigue measurements, the top head oscillates at a speed of 137 mm/min for $\epsilon$=60% and 672 mm/min for $\epsilon$=2% E' and E" are measured as a function of $\omega$ with a prestrain of 5%.

Figure 13B:
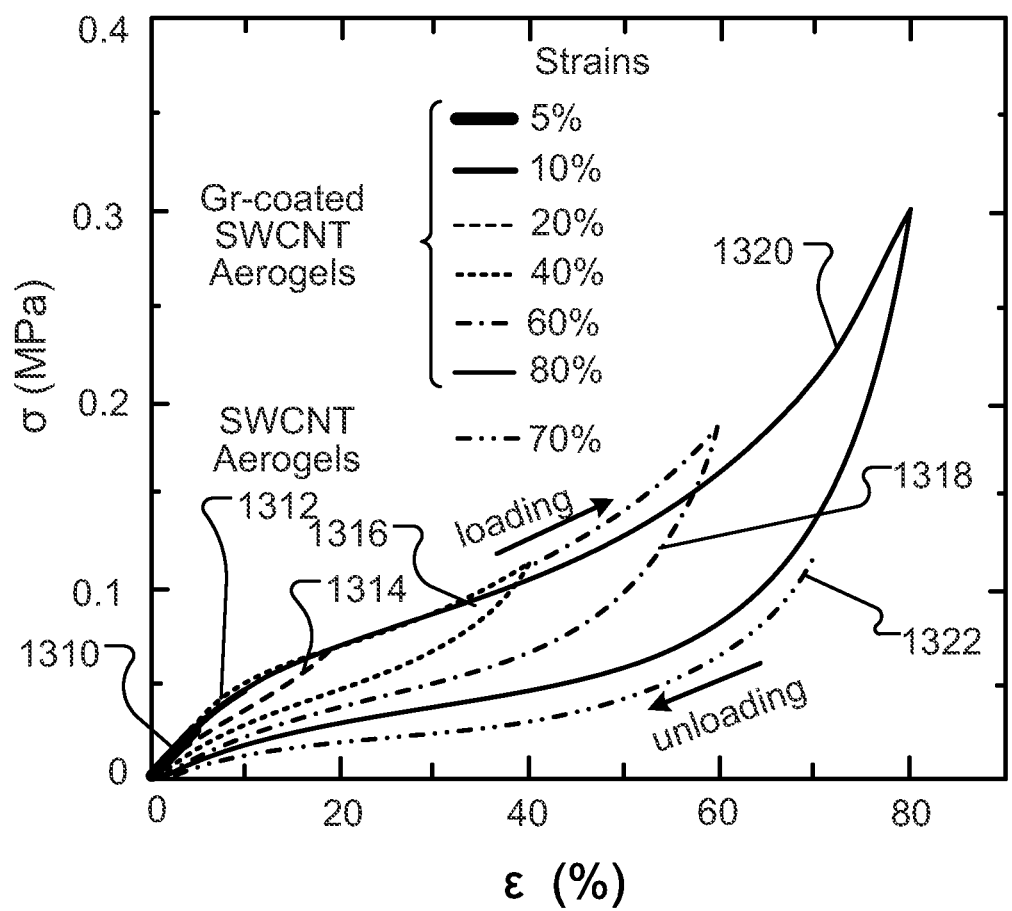

There was no reconfiguration of Gr-coated SWCNTs in the recovered aerogels compared with uncompressed aerogels, as measured by high resolution SEM. $\sigma$ is plotted as a function of $\epsilon$ in FIG. 13B during the first compression for SWCNT aerogels ($\rho$=8.8 mg/ml) and from an average of the first 20 loading-unloading cycles for Gr-coated SWCNT aerogels ($\rho$=14 mg/mL with SWCNT concentration of 8.8 mg/mL). Plots 1310, 1312, 1314, 1316, 1318, and 1320 correspond to $\epsilon$=5%, 10%, 20%, 40%, 50%, 60%, and 80%, respectively, for Gr-coated SWCNT aerogels. For Gr-coated SWCNT aerogels at any stress, there is no significant change in $\sigma$ between the first 20 loading-unloading cycles and the error in $\sigma$ is about 0.3% for all $\epsilon$ except for $\epsilon$=5% for which the error is 0.6% (FIG. 13B). The curves show three characteristic regions with gradual crossover between the regions, which have also been observed for open-cell foam-like structures: a Hookean region for $\epsilon \leq 7\%$, a plateau region for $7\% < \epsilon < 25\%$, and a densification region for $\epsilon \geq 25\%$ with rapid rise in σ for $\epsilon > 50\%$. In the Hookean region, a increases linearly with ε. The elastic modulus (E), calculated from the slope, is about 0.12 MPa for SWCNT aerogels, but Gr-coated SWCNT aerogels show a 6-fold increase in E to about 0.75 MPa, possibly from strengthening of the nodes between the SWCNTs by graphene. The specific elastic modulus (E/ρ) of 54 MPa·cm$^3$/g for Gr-coated SWCNT aerogels is much larger than most other polymeric, carbon-based and CNT porous structures. In the plateau region, a increases more gradually with ε, possibly from sliding of the nodes associated with reduction in the void volume and bending/buckling of graphene (for Gr-coated SWCNT aerogels). The SWCNTs and the Gr-coated SWCNTs pack with increased ε in the densification region resulting in a rapid increase in σ.

SWCNT aerogels deform during loading to $\epsilon = 70\%$, as seen in plot 1322 in FIG. 13B. Conversely, Gr-coated SWCNT aerogels can be unloaded and return to their original shape, but hysteresis loops are found in σ for Gr-coated SWCNT aerogels from loading-unloading cycles indicating dissipation due to friction between the struts. At $\epsilon = 5\%$, the Gr-coated SWCNT aerogels show negligible dissipation (<2%) but dissipation steadily increases with ε. However, the Gr-coated SWCNT aerogels are significantly more elastic (40-80%) than other CNT-based porous structures, either vertical forest or blocks, at comparable ε. The σ unloading curves reach the origin at each ε, indicating a complete shape recovery of Gr-coated SWCNT aerogels.

Figure 13C:
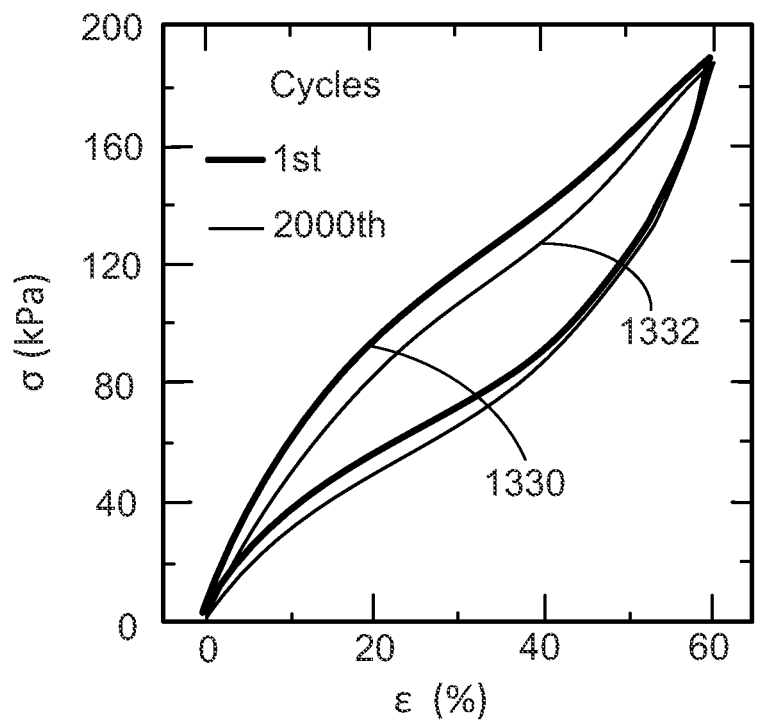
Figure 13D:
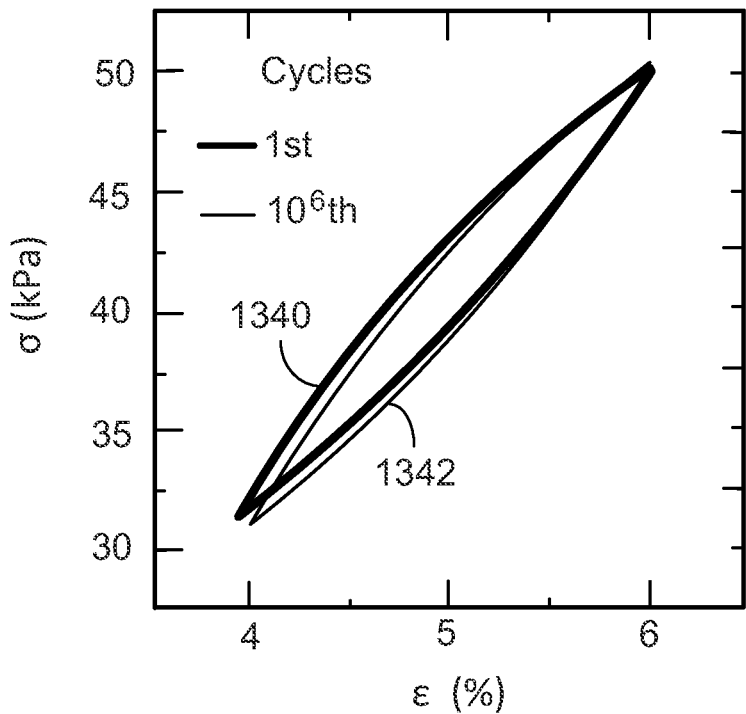

The Gr-coated SWCNT aerogels show extreme fatigue resistance. The hysteresis curves in σ obtained from 1 (plots 1330 and plot 1340) to 2,000 (plot 1332) loading-unloading cycles at a very large $\epsilon = 60\%$ at 1 Hz (FIG. 13C) and for $10^6$ cycles (plot 1342) at $\epsilon = 2\%$ at 100 Hz show no significant deformation of the aerogels and reduction in the compressive strength (FIG. 13D). The cycle numbers represent the lower bound for the fatigue resistance for Gr-coated SWCNT aerogels. In comparison, plastic deformation and reduction of compressive strength are significant in polymeric foams (plastic deformation is 10-30% at ε about 20%) and other CNT-based porous structures (plastic deformation is 8-20% at similar strain). These Gr-coated SWCNT aerogels recover their original shape at least at the speed of the compression head which was within the range of 8 mm/min (when $\omega = 100$ Hz) to 672 mm/min (when $\omega = 100$ Hz), indicating structural robustness. These recovery rates, and the associated range of rates, are much faster than that of conventional polymeric foams (about 20 μm/min) and other CNT-based porous structures (≤120 mm/min).

Figure 14A:
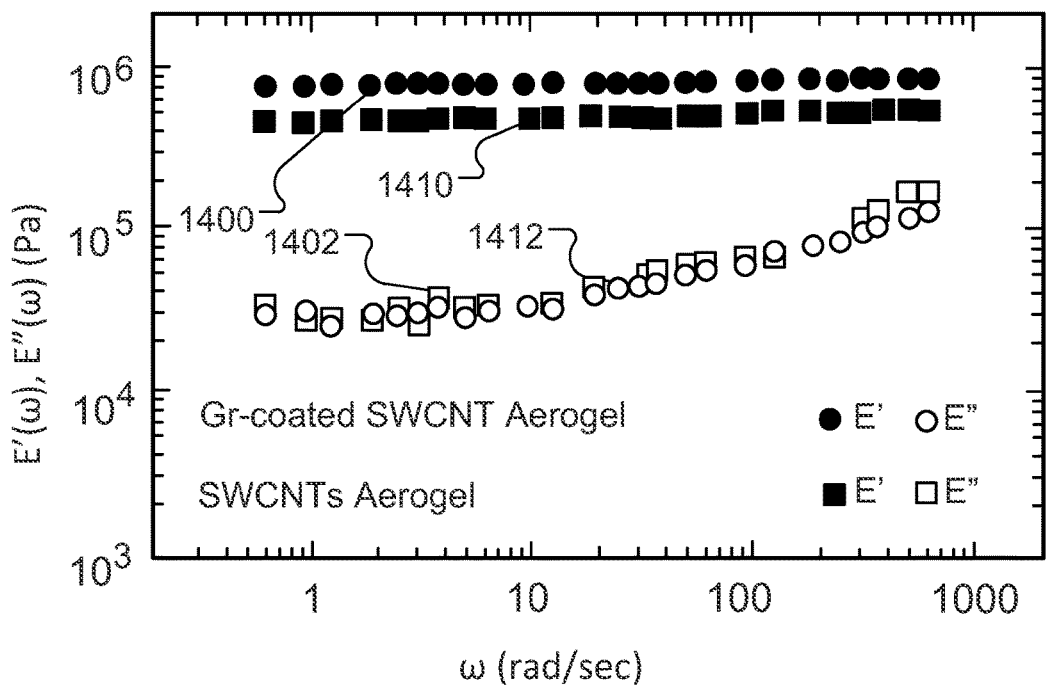
FIGS. 14A-14B illustrate graphene as it imparts superelasticity to Gr-coated SWCNT aerogels.
Figure 14B:
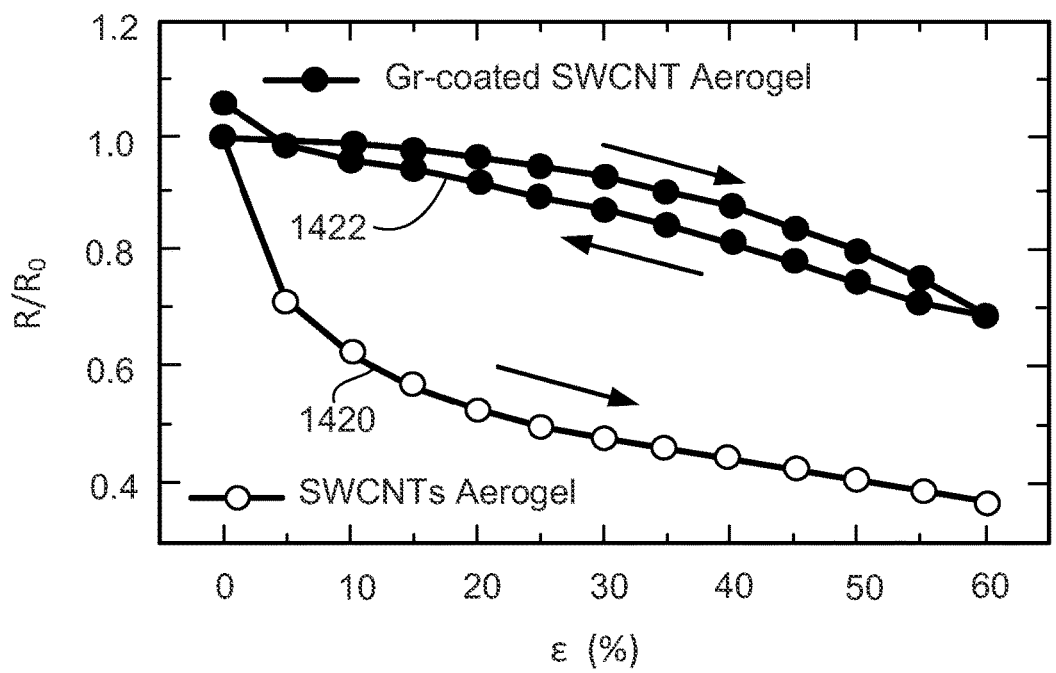

To elucidate the role of graphene in imparting superelastic behavior in Gr-coated SWCNT aerogels, the dependence of E' and E" on ω and ε is compared to the dependence of R on ε. For both SWCNT and Gr-coated SWCNT aerogels, E' is nearly independent of ω over the three decades of accessible ω-range of 0.4-400 rad/s (FIG. 14A). E' of Gr-coated SWCNT aerogel (plot 1400) is 1.6 times larger than that of SWCNT aerogel (plot 1410), possibly due to a contribution from graphene. On the other hand, E" for SWCNT (plot 1412) and Gr-coated SWCNT aerogels (1402) are nearly identical; E" is independent of ω below 12.57 rad/s but show a small co-dependence above 188 rad/s. Graphene is an efficient lubricator, but the nearly identical values for E" for SWCNT and Gr-coated SWCNT aerogels is interpreted as evidence that graphene does not introduce superelasticity to the network via lubrication. The dependence of normalized electrical resistance (R/R$_0$) on ε changes from SWCNT aerogels to Gr-coated SWCNT aerogels is observed to be: R/R$_0$ decreases dramatically (>60%) with ε for SWCNT aerogels (plot 1420), but the change in R/R$_0$ for Gr-coated SWCNT (plot 1422) is more gradual and is only about 20% (FIG. 14B); here R$_0$ is the electrical resistance at $\epsilon = 0\%$.

Figure 15:
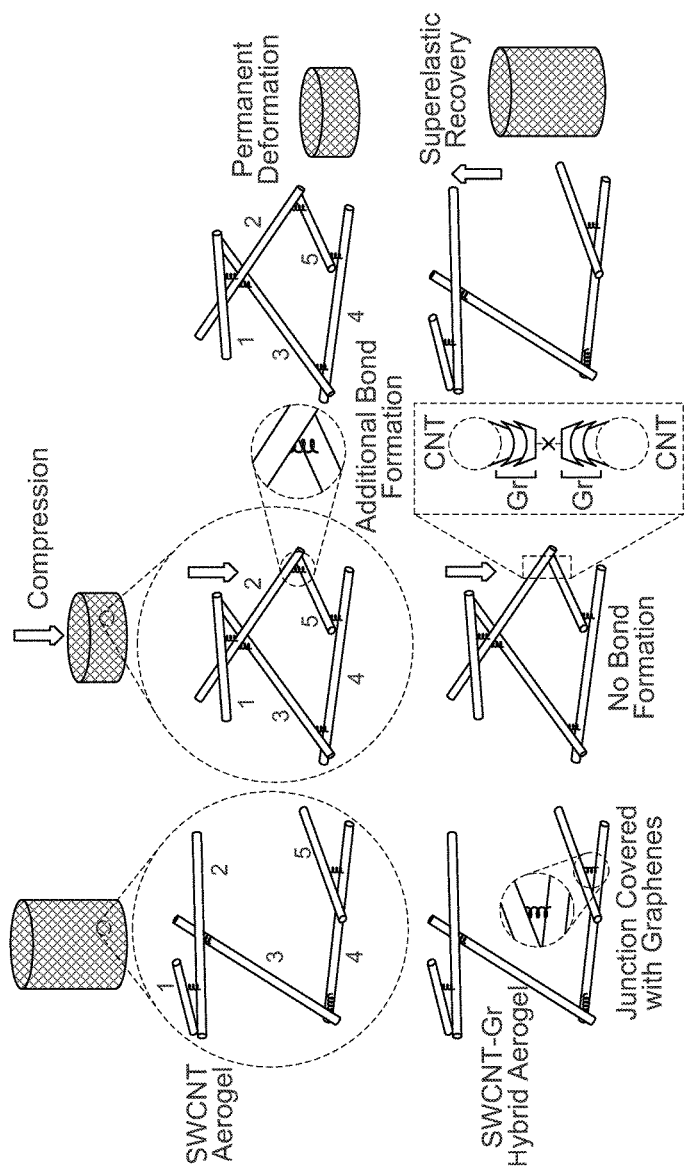
FIG. 15 is a schematic representation of the graphene coating on SWCNTs, showing the mechanism by which the network is made elastic.

The inability of SWCNT aerogels to recover their original shape after removal of load is thought to be due to formation of new nodes between SWCNTs under ε: node formation costs little energy but node removal requires overcoming large van der Waals attraction. The new nodes create additional pathways for electrical charge to travel, so SWCNT aerogels show dramatic reduction in electrical resistance with compression, but when the load is removed, the newly created nodes in the SWCNT aerogel do not allow a return to its original shape. The graphene coating hinders the formation of new nodes in compressed Gr-coated SWCNT aerogels. As a result, the electrical conductivity is mostly unaltered with compression of the Gr-coated SWCNT aerogels, and aerogels spring back to original shape after removal of load. This is shown in FIG. 15.

Figure 16:
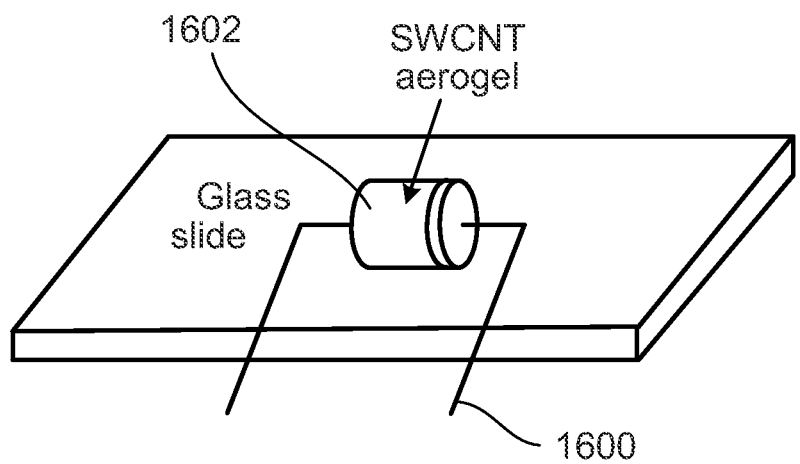
FIG. 16 depicts lead wires attached to the flat surfaces of the cylindrical aerogels.

To measure electrical conductivity of SWCNT and Gr-coated aerogels versus ε, copper wire leads 1600 are attached to the flat surfaces of the cylindrical aerogels 1602 with silver paste (e.g., DuPont 4929N) as shown in FIG. 16. Two-probe contact direct current measurements using, for example, EC-Lab V10 and Fluke Ohmmeter were made to measure resistance during strain application.

The mechanism of elasticity in SWCNT networks is applicable to other CNT-based porous structure since they are as synthesized CNT forests and graphene generation is ubiquitous in CNT synthesis. The methodology of graphene addition to introduce superelasticity to SWCNT networks described herein, coupled with inherent flexibility of aerogel synthesis in manipulating material shapes makes these materials attractive for dampers, electrodes, sieves, artificial muscles, scaffolds for composites, and other complex mechanical structures. While this example has been described primarily in terms of embodiments using SWCNTs, those skilled in the art will recognize that these methods are also applicable to double-wall CNTs (DW-CNTs) and multi-wall CNTs (MWCNTs), or any combination of SWCNTs, DWCNTs, and CWDNTs.

Example 4

In this example, pre-fabricated three dimensional SWCNT structures are built with individually dispersed SWCNTs as described in EXAMPLE 1. The SWCNT structures have an aspect ratio of about 1,000 and a Young's modulus of 1 TPa. The isotropic SWCNT network acts as 3D pre-rebar system in thermoplastic polyurethane (TPU). The SWCNT/TPU composites show giant enhancements of 1,154,900% and 34,000% in tensile modulus compared to those of the pristine SWCNT aerogel and bare TPU control sample regardless of the tensile direction. The excellent dispersion quality of the SWCNT network in the composite allowed sensitive NIR-fluorescence under tensile strains.

Figure 17A:
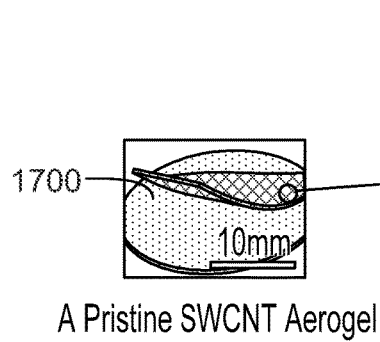
FIGS. 17A-17F depict synthesis of SWCNT aerogel/thermoplastic polyurethane (TPU) composites and SWCNT elastic-gel/TPU composites described in EXAMPLE 4.
Figure 17B:
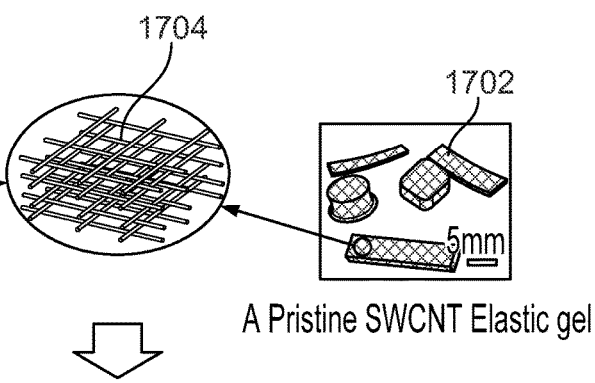
Figure 17C:
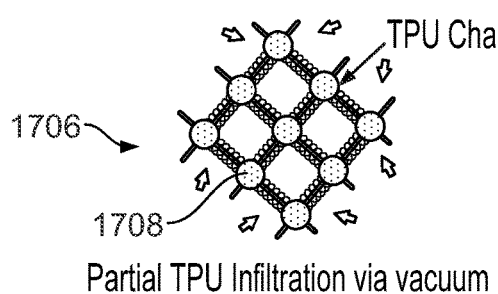
Figure 17D:
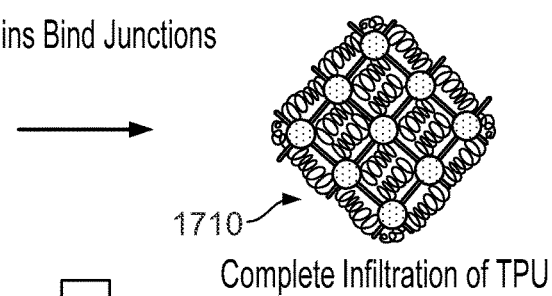
Figure 17E:
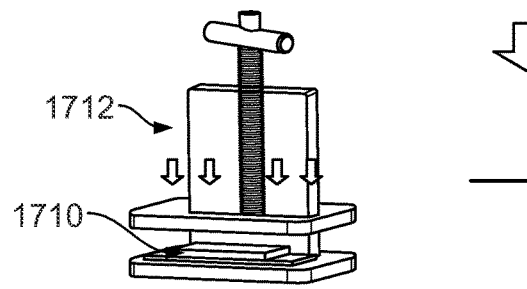
Figure 17F:
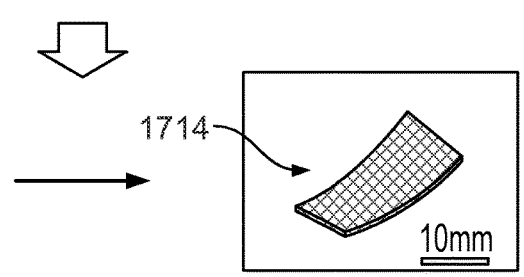

FIGS. 17A-17F depict the preparation of SWCNT aerogel/elastic-gel reinforced thermoplastic polyurethane (TPU, Bayer Materials) composites (SWCNT/TPU composites). Wet SWCNT gels were prepared by individually dispersing SWCNTs in water using 1 wt % sodium dodecylbenzene sulfonic acid (NaDDBS) and evaporating water off to the final SWCNT concentration of 0.375 wt %. The gels were then broken to transfer to the mold. The gels in the final shape were soaked in 1M nitric acid (HNO$_3$) to remove the residual surfactant effectively and then in water to neutralize the samples. After solvent exchange with anhydrous ethanol (EtOH), EtOH in the SWCNT wet gels was removed via critical-point-drying (CPD) to form the SWCNT aerogel 1700 (a-SWCNT) as shown in FIG. 17A in order to preserve three dimensional (3D) network structures of the SWCNT elastic gel 1702 (e-SWCNT) shown in FIG. 17B without shrinkage and non-uniform structural deformation. The SWCNTs are held in contact with each other by strong van der Waals force, which helps build a 3D pre-rebar system 1704 to reinforce the polymer matrix. TPU dissolved in tetrahydrofuran (THF, Acros Organics) solution (15 wt %) was infiltrated in a vacuum chamber to yield composite 1706 partially infiltrated with TPU, as shown in FIG. 17C, respectively. After evaporating THF to cure the TPU molecules, it was found that the infiltrated TPU molecules dominantly covered the junctions 1708 between SWCNTs (FIG. 17C), and thus, the structure was robust enough for further solution-based processes. The SWCNT junctions bound by van der Waals interactions could be secured tightly by the junction-wrapping TPU molecules. In the following processes, the pre-SWCNT/TPU composite blocks 1706 were soaked in 10 wt % TPU/THF solution with low viscosity for uniform impregnation of TPU molecules into the pores to form completely infiltrated composite 1710, as shown in FIG. 17D. Finally composites 1710 were hot-pressed smoothly at 130° C. for 5 min with hot press 1712 as shown in FIG. 17E after a vacuum thermal annealing process at 150° C. for 10 hrs. The average thickness of the final SWCNT-aerogel/TPU composites 1714, shown in FIG. 17F, was 200 μm. The final thickness of composite 1714 is controlled by a spacer in the hot press. The hot-press process shown in FIG. 17E at such temperature filled the thermoplastic polymer molecules in remaining nano-scaled SWCNT aerogel pores homogenously and achieved densification of the composite, resulting in removal of residual porosities in the system.

Figure 18A:
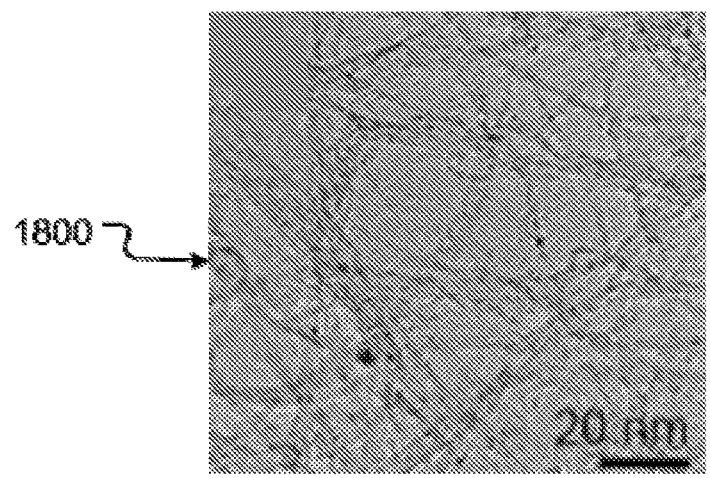
FIGS. 18A-18C depict images of a-SWCNT/TPU composites prepared as described in EXAMPLE 4.

FIG. 18A shows the high-resolution transmission electron microscopy (HR-TEM) of a prefabricated SWCNT aerogel 1800 with a density of 8.0 mg/ml. SWCNT aerogel 1800 was prepared by tip-sonication (100 W, 3 sec) in ethanol (Acros, 99.9%). Although the 3D nanotube structure was under ultrasonically induced strong cavitation, the pore structure remained reasonably undamaged without significant aggregation of SWCNTs due to such a short sonication time. The pre-fabricated 3D network of aerogel 1800 could support 8,000 times its own weight without reinforcement. The isotropic 3D network of SWCNT aerogel 1800 (ρ=8.8 mg/ml) was secured with van der Waals interactions and has an ultra-high surface area of 1282 $m^2/g$, which is closed to the theoretical value of 1315 $m^2/g$, indicating strongly that the aerogel is built with individually dispersed SWCNTs. The high surface area of the prefabricated SWCNT gel could provide an extremely large interfacial area with which to grab the matrix, and the preserved high bending modulus of each single nanotube could result in structural solidity to the matrix.

Figure 18B:
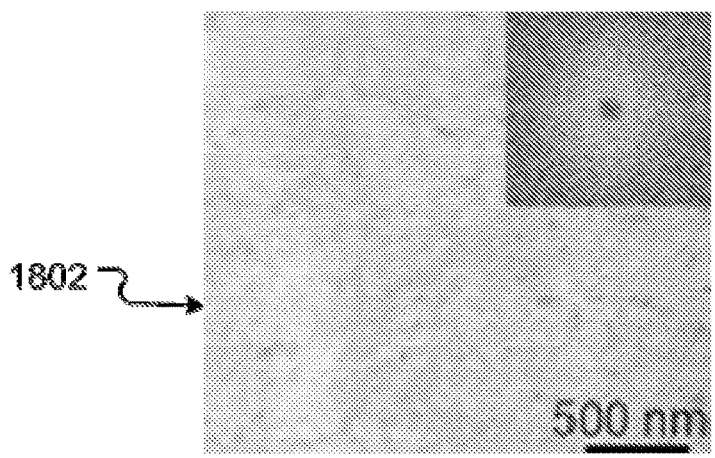
Figure 18C:
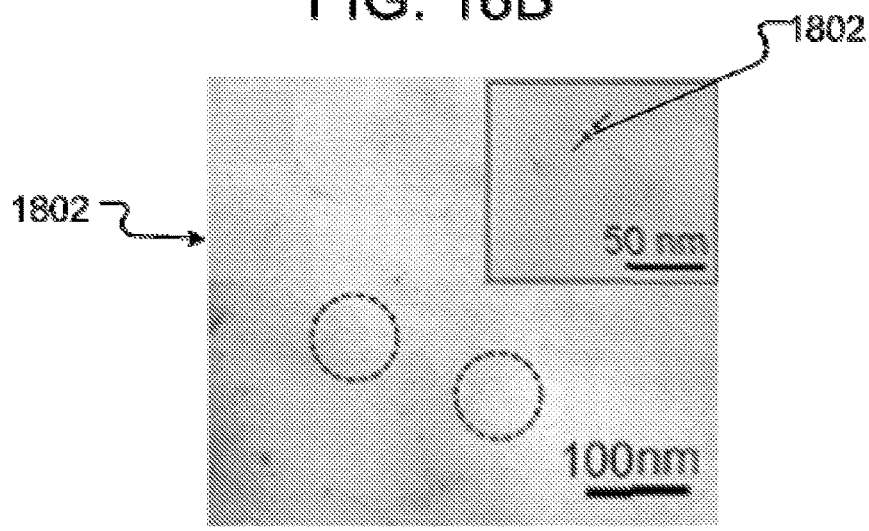

FIGS. 18B and 18C are TEM images of small piece of a-SWCNT/TPU (TPU infiltrated SWCNT aerogel) composites 1802 (8.5 vol % SWCNTs) prepared with a micro-tome before and after tensile strain (ε) of 25%. The homogeneous distribution of carbon nanotubes in the network was preserved well and no observation of pore reflects that TPU molecules completely backfilled the pores of the pre-fabricated SWCNT aerogels. The alignment of the CNT network within the composites under tensile strain was determined by calculating the orientational order parameter (S) via fast Fourier transform (FFT) of the TEM images as shown in inset of FIG. 18B. The calculated parameter of the a-SWCNT/TPU composites at 0% strain was S=0.16 indicating a completely isotropic system. Under 25% of tensile strain, the internal architecture of the SWCNT network was aligned along the tensile direction and the calculated order parameter, S=0.27, supports the alignment of SWCNTs by tensile strain. The two Poisson's ratios of the a-SWCNT/TPU composites were experimentally measured in the direction of the thickness and width ($v_w$: 0.19, $v_t$: 0.18) at the elastic region (about 5% strain) under tensile force. The values of SWCNT/TPU composites were significantly lower than that of a TPU control block ($v_w$: 0.44, $v_t$: 0.36). This indicates that the SWCNT pre-rebar system plays a role in the structural sustenance under external strain due to finite volume and high resistance to deformation coming from bended and buckled SWCNTs. The high elasticity of the composite resulted in partial recovery of the applied strain after removal of the external stress while reducing the degree of permanent deformation.

FIG. 18C shows the magnified surface morphology of a-SWCNT/TPU composite 1802 after a tensile test. The SWCNTs coated with TPU, clearly exposed during the TEM sample preparation processes including cuttings of the samples by a precision blade, show the bending with large curvature induced by the residual strain of the composite. Additionally, the small diameter of the bent TPU coated SWCNTs (d≈1.5 nm) supports the fact that the individual SWCNTs 1804 of preformed aerogel 1800 are held with the TPU molecules as shown in inset of FIG. 18C.

Figure 19A:
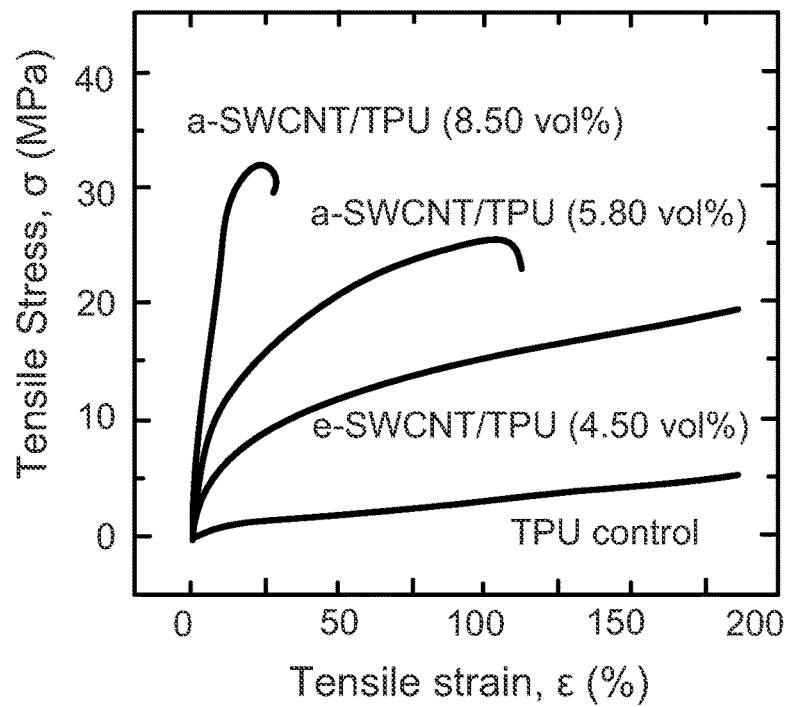
FIGS. 19A-19D show mechanical and thermal characterizations of SWCNT/TPU composites fabricated as described in EXAMPLE 4.

The SWCNT/TPU composites were prepared from prefabricated SWCNT aerogel with various SWCNT loadings (0 to about 25 vol %). FIG. 19A is a plot of stress (σ) versus strain (ε) curves of the composites for tensile tests. The tensile moduli of the samples prepared with SWCNT aerogel and pure TPU are 650.53, 389.54 and 6.63 MPa, respectively. The SWCNT elastic-gel/TPU composite (e-SWCNT/TPU, 4.5 vol %) shows 132.0 MPa of tensile modulus. The TPU composite reinforced with SWCNT aerogel with 25 vol % (not shown in plot) has an extremely improved tensile modulus (2.3 GPa), which is 34,000% higher than that of pure TPU block (TPU control, 6.63 MPa). On the other hand, the composites reinforced with an elastic gel (e-SWCNT/TPU composites) with 4.50 vol % SWCNTs (e-SWCNT/TPU (4.50 vol %) composites show lower improvement compared to a-SWCNT/TPU composites in tensile modulus (a-SWCNT/TPU (8.50 vol %) and a-SWCNT/TPU (5.80 vol %)). While the specific enhancement in tensile modulus of e-SWCNT/TPU composites, ($E_{e-SWCNT/TPU}$–$E_{TPU}$)/volume fraction of SWCNTs (ϕ=0.045), was 2.79 GPa, the a-SWCNT/TPU composites ϕ=0.058) revealed 6.60 GPa. This means that the CNT junctions in the e-SWCNT/TPU composites could be not solid due to the TPU molecules in between SWCNTs at low SWCNT concentrations. A material's resilience represents physically the ability of the material to absorb energy without any permanent damage to the material. The a-SWCNT/TPU composite (60.10KJ/$m^3$) have 1184% larger resilience compared to that of the TPU control (4.78KJ/$m^3$).

Figure 19B:
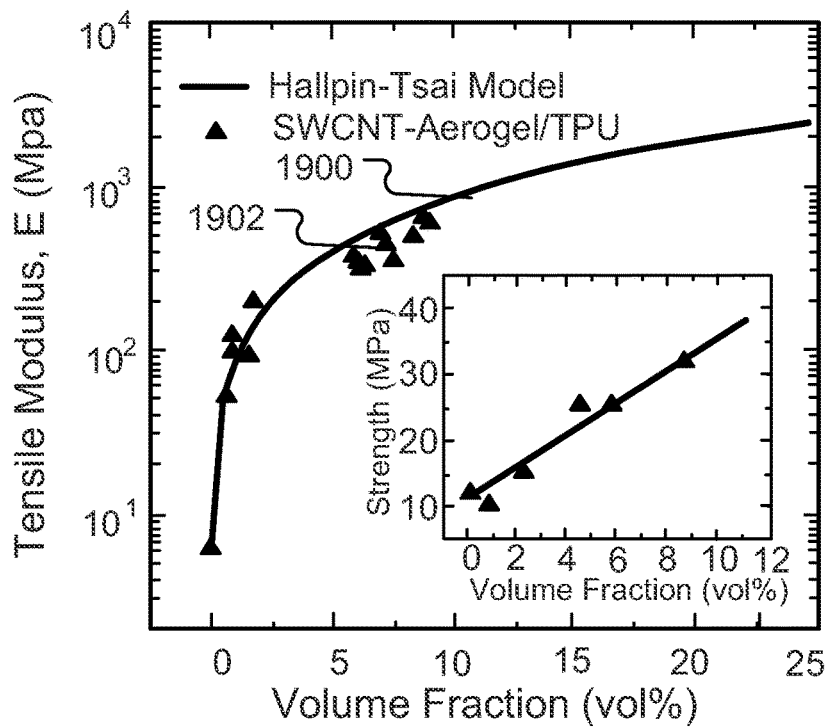

The theoretical elastic moduli of the composites as a function of SWCNT loadings were fitted with modified Halpin-Tsai equation, as shown in FIG. 19B. The Halpin-Tai model was developed for the composites reinforced with randomly oriented fiber composites and is thus applicable. The theoretical values of tensile strengths of the composites were also calculated, approached with the interfacial strength between SWCNTs and TPU polymer.

0.1456±0.0468 MPa of the interfacial strength was obtained with the thickness of polymer around SWCNTs, which indicates relatively low load transfer efficiency of SWCNTs. Even though there is low interfacial strength between SWCNTs and TPU polymer, theoretical predictions (plot 1900) described the experimental data (points 1902) well. Additionally, the Halpin-Tsi model based on the interfacial strength (0.14 MPa) shows small difference compared to the original model. This indicates that the mechanical properties of the composites are stronger functions of the high dispersion status of carbon nanotubes in the pre-fabricated aerogels than that of the interfacial strength. The 3D SWCNT network also accompanied the enhancement of the tensile strength by 180% simultaneously with the improved tensile modulus. The inset in FIG. 19B shows that the predicted strength of the composites with the interfacial strength (0.14 MPa) fit the experimental data very well. The yield strength ($\sigma_y$) is the point at which the composite begin to deform plastically. The $\sigma_{y\text{-}a\text{-}SWCNT/TPU}$ with 8.5 vol % SWCNTs is 7.5 MPa which is 34,000% higher than that of $\delta_{y\text{-}TPU}$ (22 KPa).

Mechanical characterization on the pristine aerogel with a density of 9.1 mg/ml was performed. The pristine aerogel with density (p) of 9.1 mg/ml revealed 0.2 MPa of tensile modulus, while compressive modulus of the aerogel with $\rho$=9.9 mg/ml is 0.21 MPa. This supports that the SWCNT-aerogel could enhance the mechanical property of the polymer composites regardless of the direction of external force due to their isotropic structure. In addition, the tensile modulus of the a-SWCNT/TPU composite (25.0 vol %) appeared significantly enhanced by 1,154,900% compared to that of pristine aerogel.

Figure 19C:
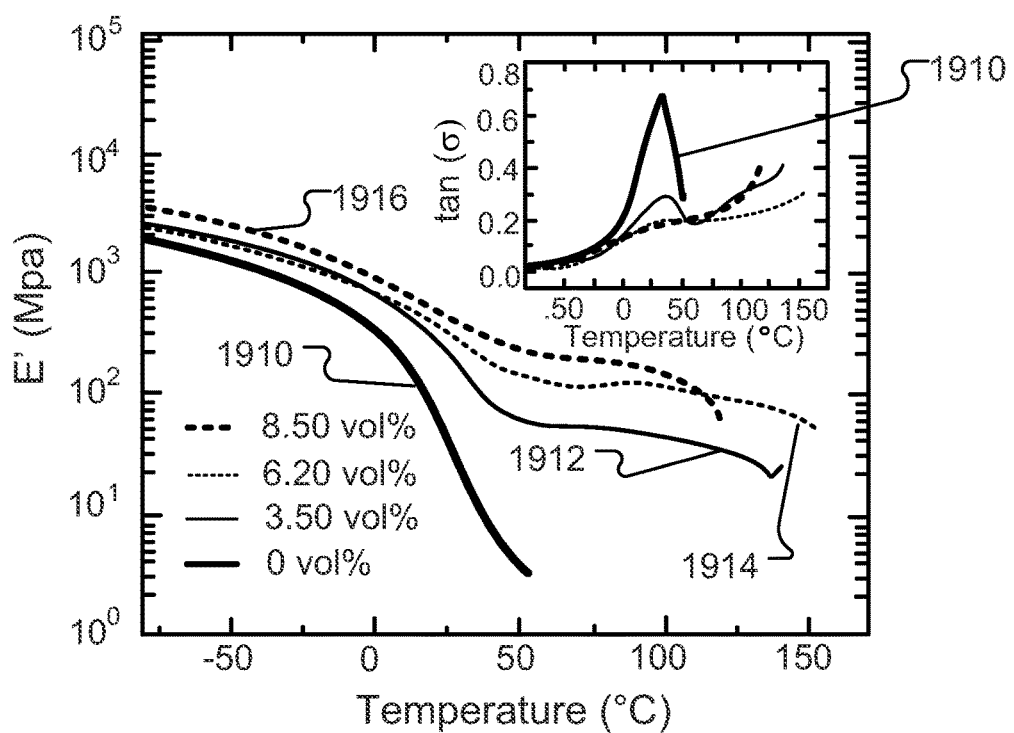

To identify the preferential reinforcement, dynamic mechanical analysis (DMA) on the SWCNT/TPU was carried out, as shown in FIG. 19C, with plots 1910, 1912, 1914, and 1916 indicating 0 vol %, 3.5 vol %, 6.2 vol %, and 8.5 vol %, respectively. The $T_{m,ss}$ of the SWCNT/TPU with 0, 3.5 and 8.5 are 30.36, 34.47, 35.80 and 45.79° C., respectively. Above the glass transition temperature, −45° C., of soft segment ($T_{g,ss}$), the tensile storage modulus (E') of the nanocomposites increased significantly by incorporation of SWCNT aerogel. The breakage of TPU control (plot 1910, 0 vol %) in E' at 50° C. may be due to the melting of soft segments. The a-SWCNT/TPU endures the constant applied prestress (0.2 MPa; corresponding 1% prestrain) in addition to the larger stress when further strained. The a-SWCNT/TPU did not fail over the broader temperature range from −70 to 150° C. since the SWCNT aerogel act as an excellent pre-rebar system. The inset in FIG. 19C shows tan($\delta$) for the composites containing between 0 and 8.50 vol %. As the concentration of SWCNTs increased, the melting temperature of soft segment increased from 30.36° C. to 45.80° C.

Figure 19D:
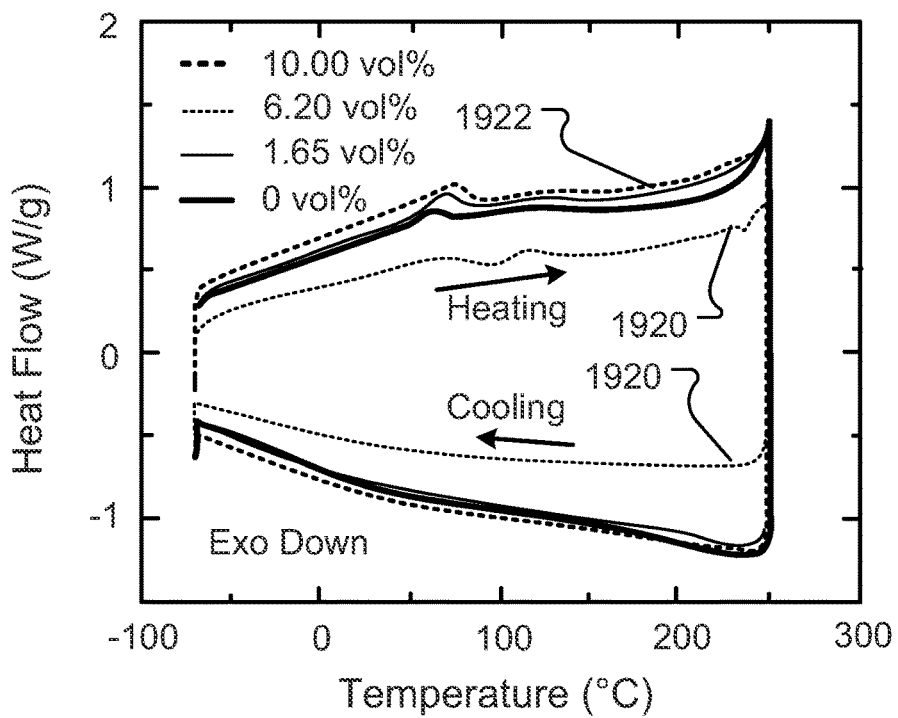

The reinforcement mechanism comes from differential scanning calorimetry (DSC) analysis shown in FIG. 19D. The $T_{m,hs}$ of the SWCNT/TPU with 0, 1.65, 6.20 and 10.00 vol % are observed from 58.5 (0 vol %) to 72.7° C. (10.0 vol %) in the DSC measurement. Suppression of the thermal motion of the TPU is seen when it is constrained around highly dispersed SWCNTs (plot 1920, 0 vol %; plot 1922, 10.00 vol %). This effect should result in a shift in ($T_{g,hs}$) toward the higher values. The up-shift of the $T_{m,hs}$ in DSC measurement was observed from 58.50 to 72.60° C., which indicates SWCNT aerogel in the TPU has good dispersion. Furthermore, the optical, TEM image and the Raman spectra of the residual SWCNT aerogel after TGA measurement of a-SWCNT/TPU in air support that the SWCNT aerogel has a noticeable effect on heat dissipation due to its high dispersion status and surface area. Aliphatic hard segments do not readily crystallize so that there is no obvious evidence of re-crystallization on cooling.

The electrical conductivity of the a-SWCNT/TPU composites was also measured. The maximum conductivity of 3.9 S/cm was observed with 3.5 vol % SWCNTs, while the e-SWCNT/TPU composites show only 0.01 S/cm which can be correlated to the low mechanical improvement due to the high electrical contact resistance induced by the TPU molecules intervening adjacent nanotubes. The high conductivity of the a-SWCNT/TPU composite indicates that the interfacial contacts between adjacent nanotubes stay unaffected during the polymer infiltration process. This conductivity is higher by more than factor of 5 than that of the previously reported conductivity of elastomeric composites which were synthesized without specific chemical, metal agents and millimeter-long CNTs for enhancement of the electrical properties. Additionally, it is expected that the junctions of nanotubes secured with TPU molecules endure against the external force and the bending modulus of SWCNTs dominates the mechanical properties of the composites in the elastic region consistent with the theoretical results as shown in FIG. 19B. After elastic region, the debonding of the CNT junction was accompanied with increase of the inter-particle distance, inducing the large electrical resistance. For individually dispersed semiconducting SWCNTs, photoluminescence is emitted in the near infra-red range induced by electron transition, followed by the strongly enhanced resonance Raman scattering. On the other hand, no emission occurs in entangled or large bundled nanotubes due to resonant energy transfer to adjacent nanotube. Therefore, the NIR fluorescence can be an indicator to evaluate the dispersion status of SWCNTs quantitatively.

Figure 20A:
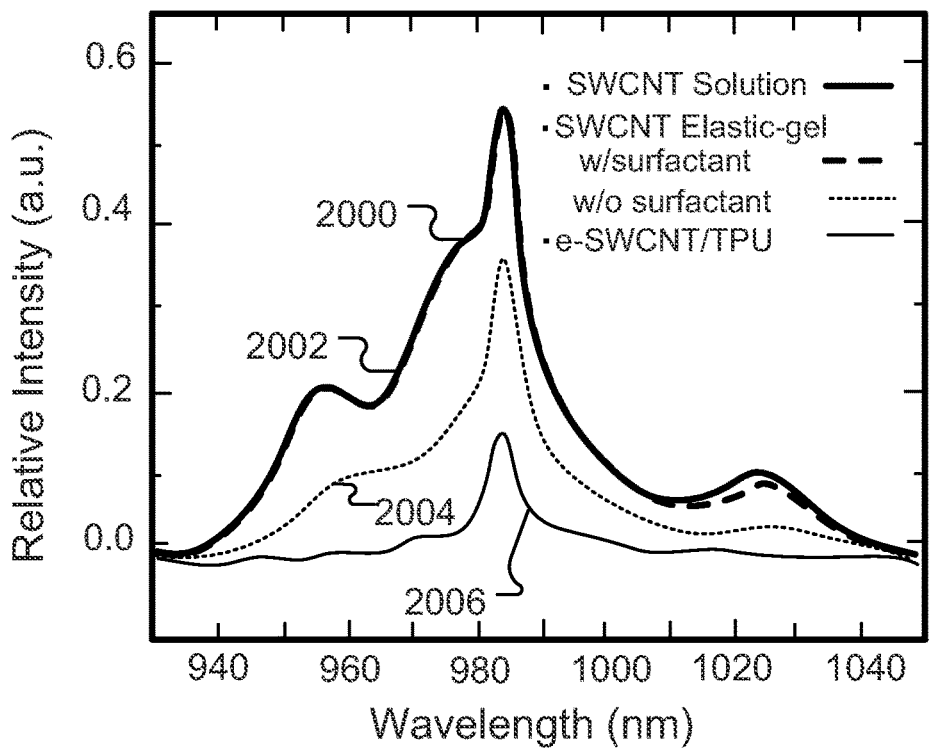
FIG. 20A shows near infrared (NIR) fluorescence of the suspended SWCNTs in surfactant in various stages of production of the aerogel and composition described in EXAMPLE 4.

FIG. 20A shows a comparison of the emission spectra of high concentrated SWCNTs suspended in NaDDBS solution before forming elastic-gel (plot 2000), SWCNT elastic gel with surfactant (plot 2002), surfactant removed elastic-gel (plot 2004), and a SWCNT/TPU elastic gel composite film (plot 2006). Even though the concentration of SWCNTs in the solution was high (0.375 wt %), NIR fluorescence was clearly observed since NaDDBS with a 12-carbon alkyl chain around SWCNT surface acted as efficient dispersant agent to prevent the aggregation (plot 2000). An identical fluorescence regime to that SWCNT solution was preserved after forming an elastic-gel (plot 2002). The elimination of NaDDBS from the elastic-gel resulted in small degradation of the intensity of fluorescence due to the decreased inter-particle distance of SWCNTs, causing the self-quenching effect of emitted energy under exposing laser source (plot 2004). A 5% of reduction in the volume was observed after washing out the NaDDBS. No fluorescence was observed on the e-SWCNT/TPU composites (plot 2006), thought to be because the inter-particle distance between nanotubes was significantly reduced by shrinkage of TPU molecular chains during the evaporation of THF solvent.

Figure 20B:
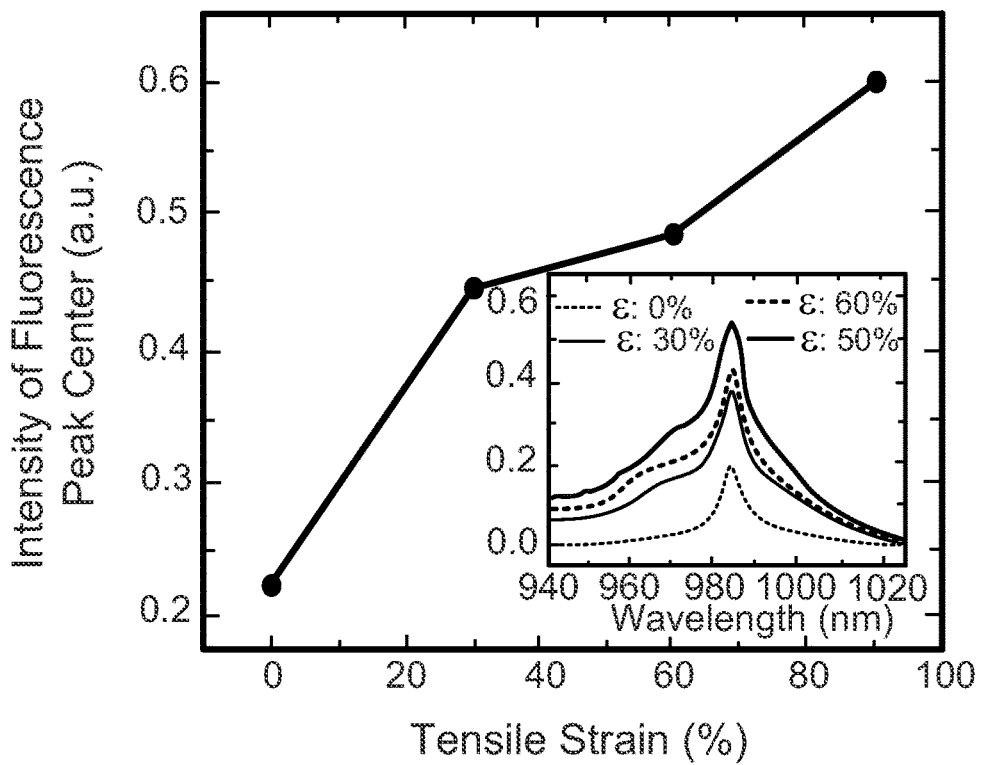
FIG. 20B shows a comparison of fluorescence intensity at 984.5 nm from the e-SWCNT/TPU composites described in EXAMPLE 4. The inset in FIG. 20B shows the strain induced NIR-fluorescence Raman spectra.

FIG. 20B shows the intensity of the maximum emission-peak (984.5 nm) of e-SWCNT/TPU composite film (8.5 vol %) as a function of tensile strain using a 785 nm (1.58 eV) excitation laser. The peak intensity increased with increasing strains. The inset of FIG. 20B shows the original spectra from the composites, with $\epsilon$ in the order of 0%, 30%, 60%, and 90% from lowest to highest, respectively.

Figure 20C:
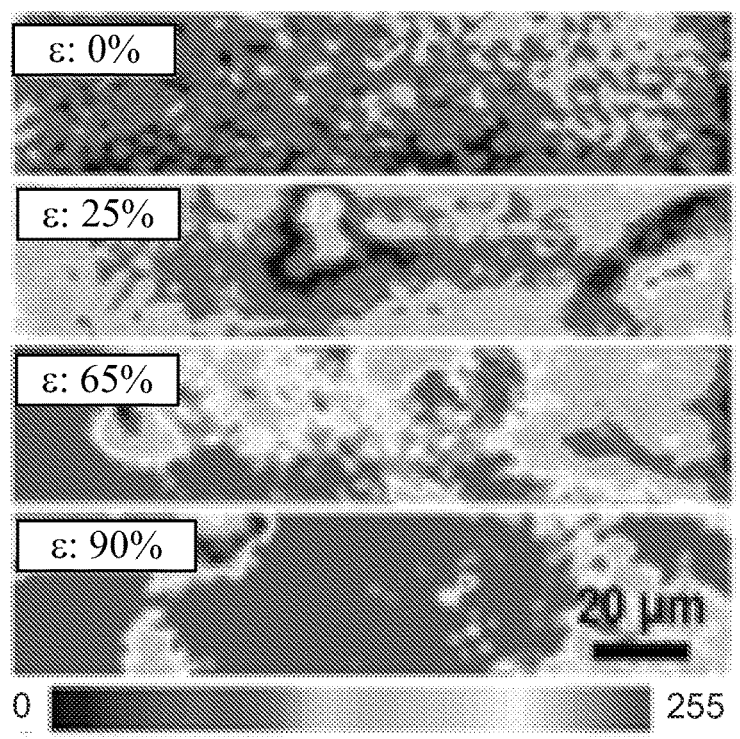
FIG. 20C shows a 2D mapping image of the strain induced NIR fluorescence on the e-SWCNT/TPU composites as described in Example 4.

2 dimensional (2D) mapping scanning of NIR fluorescence Raman spectra was carried out at the area with 160 μm×130 μm. FIG. 20C shows the intensity of collected emission between about 940 nm and about 1020 nm under various tensile strains. The images reveal that the area of high intensity is apparently widened with increasing tensile strains of the e-SWCNT/TPU composites. The enhancement of fluorescence under tensile strain indicates that the stretched TPU molecules between individually dispersed nanotubes in the TPU matrix induced large inter-particle distance. The radial breathing mode (RBM) of SWCNTs in the Raman spectra provide the degree of SWCNT aggregation.

Figure 20D:
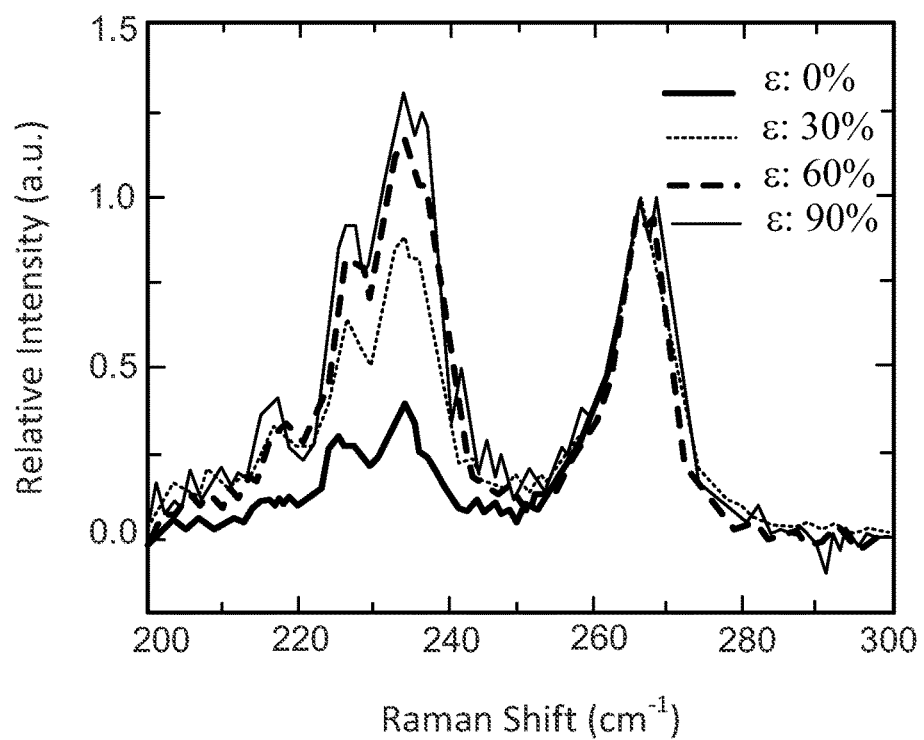
FIG. 20D shows a comparison of radial breathing mode (RBM) intensity at 234 $cm^{-1}$ which is normalized with the G peak (1590 $cm^{-1}$) intensity, following normalization with the intensity at 267 $cm^{-1}$.

FIG. 20D shows RBM spectra of e-SWCNT/TPU obtained from e-SWCNT/TPU composites, with $\epsilon$ in the order of 0%, 30%, 60%, and 90% from lowest to highest, respectively. To compare the peak intensity showing bundling of SWCNTs, the peaks in RBM region (200~300 $cm^{-1}$) were normalized with the peak at 267 $cm^{-1}$, followed by the primary normalization with intensity of G peak at ~1590 $cm^{-1}$. This result agrees well with the increasing fluorescence at higher strain.

SWNT-carbon aerogel foam scaffolds incorporated with poly(dimethylsiloxane) (PDMS) exhibit ~300% enhancement in Young's modulus (E) at the SWCNT loading level (1.0 vol %). The TPU composites synthesized via solvent exchange processing show a 2,100% increase in the tensile modulus and their tensile strength increased by 100% at 20 wt % discotic clay nano-platelets. Nano-clay sheets were used for reinforcement of poly(vinyl alcohol) (PVA). The PVA composite films shows 275% and 665% enhanced tensile strength and modulus. Additionally, the surface functionalized nano-clay sheets further improved the strength and modulus by 900% and 6135% at 50 vol % loading level, respectively.

A number of embodiments of the invention have been described. Nevertheless, it will be understood that various modifications may be made without departing from the spirit and scope of the invention. Accordingly, other embodiments are within the scope of the following claims. Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description. Changes may be made in the elements described herein without departing from the spirit and scope as described in the following claims. All cited patents, patent applications and references are incorporated by reference in their entireties for all purposes.

What is claimed is:

1. A method comprising:
    forming an aqueous suspension comprising carbon nanotubes and a surfactant;
    agitating the aqueous suspension to form an agitated suspension;
    centrifuging the agitated suspension to form a supernatant comprising the carbon nanotubes;
    concentrating the supernatant to form a concentrated suspension comprising the carbon nanotubes;
    forming a hydrogel from the concentrated suspension, the hydrogel comprising the carbon nanotubes and the surfactant;
    contacting the hydrogel with a strong acid to form an acidic hydrogel and to remove the surfactant from the hydrogel;
    neutralizing the acidic hydrogel to form a neutralized hydrogel;
    contacting the neutralized hydrogel with a fluid comprising a solvent and a polymeric material to deposit the polymeric material on the carbon nanotubes to form a wet gel comprising the polymeric material;
    forming an aerogel from the wet gel, the aerogel comprising a three-dimensional network comprising carbon nanotubes and defining voids between the carbon nanotubes and nodes at which two of the carbon nanotubes directly contact each other;
    degassing the aerogel; and
    heating the aerogel to form graphene from the polymeric material, wherein the graphene is formed on the nodes which are located throughout the three-dimensional network.

2. The method of claim 1, wherein the carbon nanotubes are single-wall carbon nanotubes, double-wall carbon nanotubes, multi-wall carbon nanotubes, or any combination thereof.

3. The method of claim 1, further comprising degassing the concentrated suspension before forming the hydrogel.

4. The method of claim 1, wherein the aerogel is a first aerogel, and further comprising forming a second aerogel from the neutralized hydrogel.

5. The method of claim 4, wherein forming the second aerogel from the neutralized hydrogel comprises autoclaving the neutralized hydrogel.

6. The method of claim 1, wherein the wet gel is a first wet gel, and further comprising replacing water in the neutralized hydrogel with ethanol to form a second wet gel comprising ethanol and the carbon nanotubes.

7. The method of claim 6, wherein the aerogel is a first aerogel, and further comprising forming a second aerogel from the second wet gel, wherein forming the second aerogel comprises critical point drying or freeze drying the second wet gel to form the second aerogel.

8. The method of claim 7, wherein the second aerogel consists essentially of carbon nanotubes.

9. The method of claim 8, wherein the second aerogel consists essentially of single-walled carbon nanotubes.

10. The method of claim 7, wherein the polymeric material is a first polymeric material, and further comprising:
    contacting the second aerogel with a second polymeric material; and
    infiltrating the second aerogel with the second polymeric material to form an infiltrated aerogel.

11. The method of claim 10, wherein the second polymeric material comprises an elasotomer or a thermoplastic.

12. The method of claim 10, wherein the composite is a first composite, and further comprising curing the second polymeric material in the infiltrated aerogel to form a second composite.

13. The method of claim 12, further comprising hot-pressing the second composite.

14. The method of claim 1, wherein the neutralized hydrogel is substantially free from surfactant.

15. The composite of claim 1.

16. The elastic conductor of claim 15, wherein the elastic conductor is transparent.

17. An elastic conductor comprising the composite of claim 1.

18. The method of claim 1, wherein the strong acid is nitric acid.

19. An aerogel comprising:
    a three-dimensional network comprising carbon nanotubes, the network defining voids between the carbon nanotubes and nodes at which two of the carbon nanotubes in the network directly contact each other; and graphene is formed on the nodes which are located throughout the three-dimensional network to yield an elastic aerogel.

20. The aerogel of claim 19, wherein a specific surface area of the aerogel is at least 1200 m²/g.

21. The aerogel of claim 19, wherein a density of the aerogel is in a range between 0.1 mg/ml and 30 mg/ml or between 0.3 mg/ml and 10 mg/ml.

22. The aerogel of claim 21, wherein the aerogel recovers its original shape at a rate in a range of 8 mm/min to 672 mm/min after removal of a load.

23. The aerogel of claim 19, further comprising a polymer in voids defined by the carbon nanotubes.

24. A composite comprising:
an aerogel comprising:
a three-dimensional network comprising carbon nanotubes, the network defining voids between the carbon nanotubes and nodes at which two of the carbon nanotubes directly contact each other; and
graphene is formed on the nodes which are located throughout the three-dimensional network; and
a polymeric material at least partially filling the voids between the carbon nanotubes.

25. The composite of claim 24, wherein a specific surface area of the aerogel is at least 650 m²/g.

26. The composite of claim 24, wherein the polymeric material is thermoplastic urethane, and a tensile modulus of the composite exceeds a tensile modulus of the aerogel by at least 1 ×10⁶%.

27. The composite of claim 24, wherein the composite emits near infrared fluorescence under tensile strain.

28. The composite of claim 24, wherein the composite is electrically conductive.

29. The composite of claim 24, wherein the composite is transparent.

30. The composite of claim 24, wherein the composite is flexible.

31. The composite of claim 24, wherein dimensions of the composite demonstrate shrinkage compared to a wet gel from which the composite is formed of less than 10% in each dimension.

32. A device comprising the composite of claim 24.

33. Packaging material comprising the composite of claim 24.

34. A coating comprising the composite of claim 24.

35. A device comprising a conductive composite, the conductive composite comprising:
an aerogel comprising:
a three-dimensional network comprising carbon nanotubes, the network defining voids between the carbon nanotubes and nodes at which two of the carbon nanotubes in the network directly contact each other; and
graphene is formed on the nodes which are located throughout the three-dimensional network; and
a polymeric material at least partially filling the voids between the carbon nanotubes.

36. The device of claim 35, wherein the device is an electrode.

37. The device of claim 35, wherein the device is an elastic conductor.

38. The device of claim 35, wherein the device is a sensor.

* * * * *

UNITED STATES PATENT AND TRADEMARK OFFICE
CERTIFICATE OF CORRECTION

PATENT NO. : 9,725,601 B2
APPLICATION NO. : 14/009692
DATED : August 8, 2017
INVENTOR(S) : Mohammad F. Islam et al.

Page 1 of 1

It is certified that error appears in the above-identified patent and that said Letters Patent is hereby corrected as shown below:

On the Title Page

Column 2, Line 7, delete "hydrogen" and insert -- hydrogel --

In the Claims

Column 26, Line 49, Claim 11, delete "elasotomer" and insert -- elastomer --

Signed and Sealed this
Seventh Day of November, 2017

Joseph Matal
*Performing the Functions and Duties of the
Under Secretary of Commerce for Intellectual Property and
Director of the United States Patent and Trademark Office*